US012118846B2

(12) United States Patent
Small et al.

(10) Patent No.: US 12,118,846 B2
(45) Date of Patent: Oct. 15, 2024

(54) ENHANCED PERSONALIZED GESTURE INPUTS AT AN ELECTRONIC GAMING MACHINE

(71) Applicant: IGT, Las Vegas, NV (US)

(72) Inventors: David Small, Moncton (CA); David Froy, Jr., Lakeville-Westmorland (CA); Michael Russ, Graz Styria (AT)

(73) Assignee: IGT, Las Vegas, NV (US)

( * ) Notice: Subject to any disclaimer, the term of this patent is extended or adjusted under 35 U.S.C. 154(b) by 42 days.

(21) Appl. No.: 17/232,782

(22) Filed: Apr. 16, 2021

(65) Prior Publication Data

US 2021/0335087 A1 Oct. 28, 2021

Related U.S. Application Data

(60) Provisional application No. 63/013,877, filed on Apr. 22, 2020.

(51) Int. Cl.
*G07F 17/32* (2006.01)

(52) U.S. Cl.
CPC ................................ *G07F 17/3209* (2013.01)

(58) Field of Classification Search
CPC ......................... G07F 17/3202; G07F 17/3204
See application file for complete search history.

(56) References Cited

U.S. PATENT DOCUMENTS

| | | | | |
|---|---|---|---|---|
| 6,456,977 | B1 * | 9/2002 | Wang | A63H 30/04 704/E15.045 |
| 9,269,215 | B2 | 2/2016 | Thompson et al. | |
| 9,474,977 | B2 * | 10/2016 | Rom | A63F 13/22 |
| 9,511,294 | B2 * | 12/2016 | Kulavik | A63F 13/77 |
| 9,687,730 | B2 | 6/2017 | Mahlmeister et al. | |
| 9,746,929 | B2 | 8/2017 | Maruya et al. | |
| 10,043,281 | B2 | 8/2018 | Mallinson et al. | |
| 10,379,621 | B2 | 8/2019 | Schwesig et al. | |
| 10,429,943 | B2 | 10/2019 | Horowitz et al. | |
| 10,922,051 | B2 * | 2/2021 | Hanes | G06F 3/167 |
| 11,135,510 | B2 * | 10/2021 | Mahlmeister | A63F 13/428 |
| 11,385,722 | B2 * | 7/2022 | Hong | G06V 40/28 |
| 11,402,919 | B2 * | 8/2022 | Stern | G01S 13/88 |
| 11,467,672 | B2 * | 10/2022 | Sachidanandam | G06F 3/011 |
| 2005/0210417 | A1 * | 9/2005 | Marvit | G06F 1/1613 715/863 |

(Continued)

*Primary Examiner* — Dmitry Suhol
*Assistant Examiner* — Jason Pinheiro
(74) *Attorney, Agent, or Firm* — Sage Patent Group

(57) ABSTRACT

Devices, systems and methods are provided. A device may include a gesture input device to detect gesture inputs performed by a user, a processor circuit, and a memory coupled to the processor circuit. The memory includes machine-readable instructions that, when executed by the processor circuit, cause the processor circuit to receive a first gesture input value from the first gesture input device and that corresponds to a user-specific gesture that the user performs, associate the first gesture input value with a first gaming device operation to be performed by the gaming device, receive the first gesture input value that is associated with the first gaming device operation, and responsive to receiving the first gesture input value that is associated with the first gaming device operation, cause the gaming device to perform the first gaming device operation.

18 Claims, 14 Drawing Sheets

(56) References Cited

U.S. PATENT DOCUMENTS

| | | | | |
|---|---|---|---|---|
| 2011/0093820 | A1* | 4/2011 | Zhang | A63F 13/22 715/863 |
| 2011/0136568 | A1* | 6/2011 | Buhr | A63F 13/22 463/37 |
| 2012/0034904 | A1* | 2/2012 | LeBeau | H04W 4/046 455/414.1 |
| 2013/0196765 | A1* | 8/2013 | Wolff-Petersen | A63F 13/53 463/36 |
| 2013/0265218 | A1 | 10/2013 | Moscarillo | |
| 2013/0273997 | A1* | 10/2013 | Stewart | G07F 17/3244 463/20 |
| 2014/0359435 | A1* | 12/2014 | Zheng | G06F 3/016 715/702 |
| 2015/0084743 | A1* | 3/2015 | G | G07C 9/37 340/5.82 |
| 2017/0003747 | A1 | 10/2017 | Carceroni et al. | |
| 2018/0043246 | A1* | 2/2018 | Chang | A63F 13/213 |
| 2019/0258320 | A1 | 8/2019 | Yang et al. | |

* cited by examiner

ENHANCED PERSONALIZED GESTURE INPUTS AT AN ELECTRONIC GAMING MACHINE

CROSS REFERENCE TO RELATED APPLICATIONS

This application claims domestic priority to U.S. Provisional Patent Application No. 63/013,877, filed on Apr. 22, 2020, the disclosure and content of which is incorporated by reference herein in its entirety.

BACKGROUND

Embodiments described herein relate to providing input for gaming devices, and in particular to providing personalized gesture inputs at gaming devices, and related devices, systems, and methods.

Attracting players to electronic gaming machines (EGMs) in a casino environment may provide increased play of such EGMs. While game theme, content and appearance may help to attract such players, further approaches to attract players may be limited. For example, providing additional interactive functionality at the gaming device may attract players. Many conventional gaming devices employ relatively simple input devices, which may be pedantic and uninteresting. Improving the interaction between the player and the EGM may be advantageous.

BRIEF SUMMARY

According to some embodiments, a gaming device is provided. The gaming device includes a gesture input device to detect gesture inputs performed by a user, a processor circuit and a memory coupled to the processor circuit. The memory includes machine-readable instructions that, when executed by the processor circuit, cause the processor circuit to receive a first gesture input value from the first gesture input device and that corresponds to a user-specific gesture that the user performs, associate the first gesture input value with a first gaming device operation to be performed by the gaming device and receive the first gesture input value that is associated with the first gaming device operation. The processor circuit is further caused to, responsive to receiving the first gesture input value that is associated with the first gaming device operation, perform the first gaming device operation.

According to some embodiments, a system is provided. The system includes a gesture input device to detect a first gesture by a user of a gaming device and to generate a first gesture input value based on the first gesture, a processor circuit, and a memory coupled to the processor circuit. The memory includes machine-readable instructions that, when executed by the processor circuit, cause the processor circuit to receive the first gesture input value from the gesture input device, the first gesture input value corresponding to a user-specific gesture that the user performs and that is associated with a first gaming operation of the gaming device. The processor circuit is caused to, responsive to receiving the first gesture input value, cause the gaming device to perform the first gaming operation provided to the gaming device.

According to some embodiments, a method is provided. The method includes operations of detecting, by a gesture input device of a gaming device, a first gesture by a user of the gaming device and generating, by the gesture input device, a first gesture input value based on the first gesture that is a user-specific gesture. Operation further include associating the first gesture input value with a first gaming device operation to be performed by the gaming device responsive to receiving the first gesture, responsive to receiving the first gesture input value that is associated with the first gaming device operation, causing the gaming device to perform the first gaming device operation, and causing the first gesture input value, an identification of the first gaming device operation and user-specific data to be stored in a personalized gesture library that is accessible to other gaming devices, wherein the personalized gesture library comprises a persistent store of the first gesture input value, an identification of the first gaming device operation and user-specific data.

DETAILED DESCRIPTION

Figure 1:
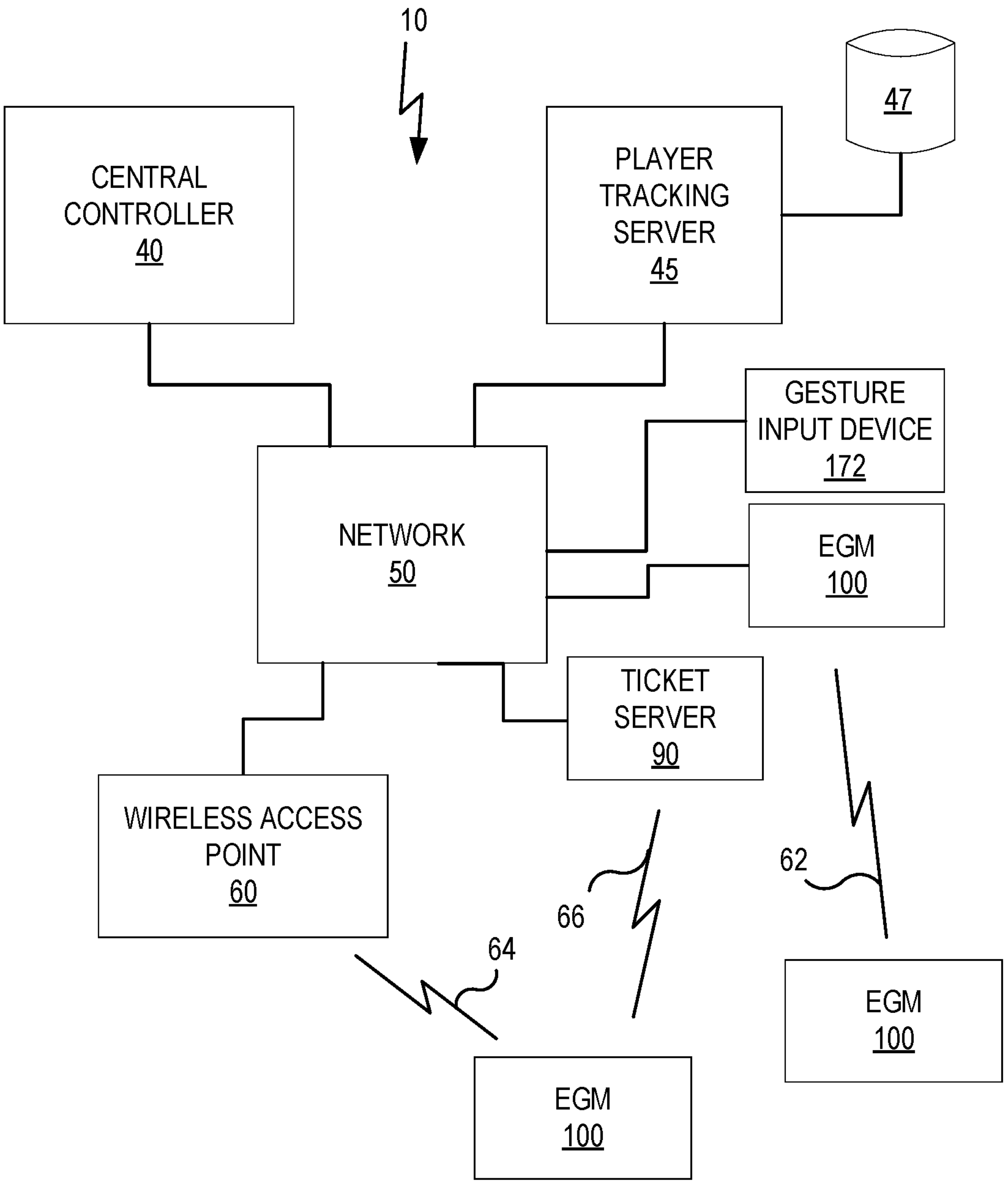
FIG. 1 is a schematic block diagram illustrating a network configuration for a plurality of gaming devices that include personalizable gesture inputs according to some embodiments.

Some embodiments herein provide input rich game-play interaction and immersion by enhancing the human machine interface interactions using personalizable gesture inputs at an EGM.

Inventive concepts herein may make use of Gesture Recognition (GR) as a primary means for a player or technician to interact with an EGM, rather than being used for just a few specialized inputs that complement the normal interaction means such as touchscreens or buttons. By creating personalized libraries of gestures, based on both standardized common gestures and/or gestures personalized to specific user's movements and habits, EGM interaction can be more intuitive and seamless and can be customized to initiate specific sequences of instructions to be executed by the EGM that may not be possible with simple buttons or touches. In some embodiments, this concept may eliminate and/or reduce the need for touchscreens, buttons and/or button panels, which may dramatically change cabinet design of an EGM. For example, the additional space created could be repurposed to reposition and/or reshape speakers and/or screens and/or to move player tracking and other components from the vertical face of the EGM, which may allow even more screen space. Some embodiments provide that embodiments herein may provide a more unobstructed view of the screen, much like a television set. In some embodiments, gestures from multiple users may be detected and/or remembered.

Gesture personalization may be combined with voice recognition, facial recognition, voice commands and/or other biometric inputs to further personalize the experience.

Advantages according to some embodiments may include improved personal hygiene based on a reduction in the need to touch a display that may be touched by other players, etc. Further advantages may include providing a player with more complex interactions with an EGM that are not possible with buttons and/or a touch interface. For example, such complex interactions may include the ability to provide multi-step inputs and/or analog inputs, among others.

In some embodiments, user configurable gestures and/or gesture combinations may be learned and remembered by the EGM for each user. A persistent data store of the gestures that are associated with users may be provided in the EGM and/or in a remote data repository. For example, once a player is identified by an EGM, the EGM may request and/or receive the personalized gesture data corresponding to that user. Further, some embodiments provide that personalized gestures may be generated and/or define by the user at the EGM and that such data may be transmitted to the data repository.

In some embodiments, the enhanced and/or personalized gestures may reduce the need for other inputs and/or input types and thus may eliminate clutter on a front face of EGM to provide an improved player experience.

In some embodiments, enhanced and/or personalized gesture recognition may also simplify and/or speed up technician interactions with the EGM. In some embodiments, a gesture could be set to command a single EGM or multiple EGMs, such as a whole bank of proximately located EGM's at once.

Embodiments described herein may provide a focus on enriching game-play interaction and immersion by enhancing the human machine interface interactions with an EGM.

By using any one or more GR techniques such as camera, proximity, ultrasound, radar, IR, magnetic field, electric field or any others, GR can become the primary means of interacting with an EGM. This may apply to both player and technician interactions. Gesture detection devices could be located at various positions on the cabinet or chair or overhead, ceiling or wall mount depending on what types of interactions were desired (close range, at a distance, one user or multiple, etc.)

In some embodiments, voice recognition and voice commands may be used in combination with GR to further enhance the hands-free interaction.

Newly created gestures may include gestures performed by any part of the body including hands and/or extensions manipulated by the body. Body extensions may include any implement that may be controlled and/or manipulated by the body of a player. This may increase the amount of gesture personalization that can be created according to embodiments herein.

Personalized gesture libraries can be created to detect simple commands, such as spin, cash out, stop, replay, etc., and more complex sequences of commands such as "max bet twice followed by min bet 3 times," etc. These gestures and/or sequences thereof may be user configurable and may be triggered with a simple gesture. Such embodiments may provide improved accommodation for player and/or technician idiosyncrasies and/or habits.

By using any one or more GR techniques such as camera, proximity, ultrasound, radar, IR, magnetic field, electric field and/or others, GR may become the primary means of interacting with an EGM. This may apply to both player and technician interactions. Gesture detection devices could be located at various positions on the cabinet, chair, overhead ceiling, and/or wall mount depending on what types of interactions are desired (e.g., close range, at a distance, one user or multiple, etc.)

In some embodiments, gestures may also be used to generate analog inputs rather than simple binary commands such as bet, spin, etc. For example, GR may provide the ability to generate an analog command such as a slowly increased a bet, a gradual increase and/or decrease in spin speed during a spin or session, and/or to shape the math pay table curve (within regulatory constraints) by manually manipulating a visual graphic of the pay table curve.

One significant impact of this may be to eliminate or reduce the need for the button panel and/or touch screen, which may provide a cost savings and, in some cases, improve the quality of the screen image.

In some embodiments, the EGM may learn how a specific user performs specific common gestures (such as spin or cash-out). The user could specify that a sequence of common gestures could be combined to create new responses. These programmed sequences can also be customized for individual users and become unique to a user and can be re-used in future sessions.

In a similar fashion, a Service Technician's input to the EGM may be implemented and personalized to save time and simplify the efforts of the technician.

Elements of some embodiments provided herein may include combining gesture usage with player identification to avoid gesture input from others, such as other persons passing by. Personalized gesture libraries can be created to detect more complex sequences of commands than those that can be detected with touch. Examples of such sequences may include sequences of bet types and line count denominations that can be programmed. The use of natural gestures that can be understood by the EGM may be intuitive to players.

Some embodiments provide that programmed sequences can also be customized for individual players and may be unique to a player. In some embodiments, such programmed sequences may be re-used in different sessions including on different EGM's. These customized gestures may also be used for player identification, particularly in combination with one or more other data and/or types thereof.

In some embodiments, gestures described herein may be used from a distance to interact with one or more EGMs from a distance. For example, some embodiments provide that a user may want to continue playing when not standing at the EGM. In some embodiments, the player may see a game that the player desires to play that is across the room and not currently being played. In such embodiments, the player may perform a gesture that causes the EGM to reserve itself for sufficient time for the player to get to the machine.

In some embodiments, a gesture may be performed in combination with a left or right swipe in which the left swipe causes the gesture to be performed and the right swipe is used to move objects according to the direction.

Referring to FIG. 1, a gaming system 10 including a plurality of gaming devices 100 is illustrated. As discussed above, the gaming devices 100 may be one type of a variety of different types of gaming devices, such as electronic gaming machines (EGMs), mobile devices, or other devices, for example. The gaming system 10 may be located, for example, on the premises of a gaming establishment, such as a casino. The gaming devices 100, which are typically situated on a casino floor, may be in communication with each other and/or at least one central controller 40 through a data communication network 50 that may include a remote communication link. The data communication network 50 may be a private data communication network that is operated, for example, by the gaming facility that operates the gaming devices 100. Communications over the data communication network 50 may be encrypted for security. The central controller 40 may be any suitable server or computing device which includes at least one processing circuit and at least one memory or storage device. Each gaming device 100 may include a processing circuit that transmits and receives events, messages, commands or any other suitable data or signal between the gaming device 100 and the central controller 40. The gaming device processing circuit is operable to execute such communicated events, messages or commands in conjunction with the operation of the gaming device 100. Moreover, the processing circuit of the central controller 40 is configured to transmit and receive events, messages, commands or any other suitable data or signal between the central controller 40 and each of the individual gaming devices 100. In some embodiments, one or more of the functions of the central controller 40 may be performed by one or more gaming device processing circuits. Moreover, in some embodiments, one or more of the functions of one or more gaming device processing circuits as disclosed herein may be performed by the central controller 40.

A wireless access point 60 provides wireless access to the data communication network 50. The wireless access point 60 may be connected to the data communication network 50 as illustrated in FIG. 1, and/or may be connected directly to the central controller 40 or another server connected to the data communication network 50.

A player tracking server 45 may also be connected through the data communication network 50. The player tracking server 45 may manage a player tracking account that tracks the player's gameplay and spending and/or other player preferences and customizations, manages loyalty awards for the player, manages funds deposited or advanced on behalf of the player, and other functions. Player information managed by the player tracking server 45 may be stored in a player information database 47.

As further illustrated in FIG. 1, the gaming system 10 may include a ticket server 90 that is configured to print and/or dispense wagering tickets. The ticket server 90 may be in communication with the central controller 40 through the data communication network 50. Each ticket server 90 may include a processing circuit that transmits and receives events, messages, commands or any other suitable data or signal between the ticket server 90 and the central controller 40. The ticket server 90 processing circuit may be operable to execute such communicated events, messages or commands in conjunction with the operation of the ticket server 90. Moreover, in some embodiments, one or more of the functions of one or more ticket server 90 processing circuits as disclosed herein may be performed by the central controller 40.

The gaming devices 100 communicate with one or more elements of the gaming system 10 to coordinate providing wagering games and other functionality. For example, in some embodiments, the gaming device 100 may communicate directly with the ticket server 90 over a wireless interface 62, which may be a WiFi link, a Bluetooth link, a near field communications (NFC) link, etc. In other embodiments, the gaming device 100 may communicate with the data communication network 50 (and devices connected thereto, including other gaming devices 100) over a wireless interface 64 with the wireless access point 60. The wireless interface 64 may include a WiFi link, a Bluetooth link, an NFC link, etc. In still further embodiments, the gaming devices 100 may communicate simultaneously with both the ticket server 90 over the wireless interface 66 and the wireless access point 60 over the wireless interface 64. Some embodiments provide that gaming devices 100 may communicate with other gaming devices over a wireless interface 64. In these embodiments, wireless interface 62, wireless interface 64 and wireless interface 66 may use different communication protocols and/or different communication resources, such as different frequencies, time slots, spreading codes, etc.

The system 10 may also include one or more gesture input devices 172 that may include one or more gesture sensors. In some embodiments, the gesture input devices 172 may be arranged in an EGM 100 and/or in the area in which the EGM 100 is located. For example, around the gesture input device 172 may include image capture devices that are part of a casino video surveillance system and/or may be mounted to other structures including walls, columns, a ceiling and/or any other structure in the casino. Each gesture input device 172 may provide a gesture input value corresponding to the gesture performed by the player. The gesture input device 172 may include ultrasonic sensors, optical (e.g., infrared) sensors, image capture devices, and/or other suitable sensors for detecting gestures associated with the gaming device 100. In some embodiments, the gesture input device 172 may include three-dimensional (3D) gesture input sensors to detect a 3D gesture performed by the player, with each 3D gesture input sensor providing a 3D gesture input value corresponding to the 3D gesture performed by the player.

Gaming Devices

Figure 2A:
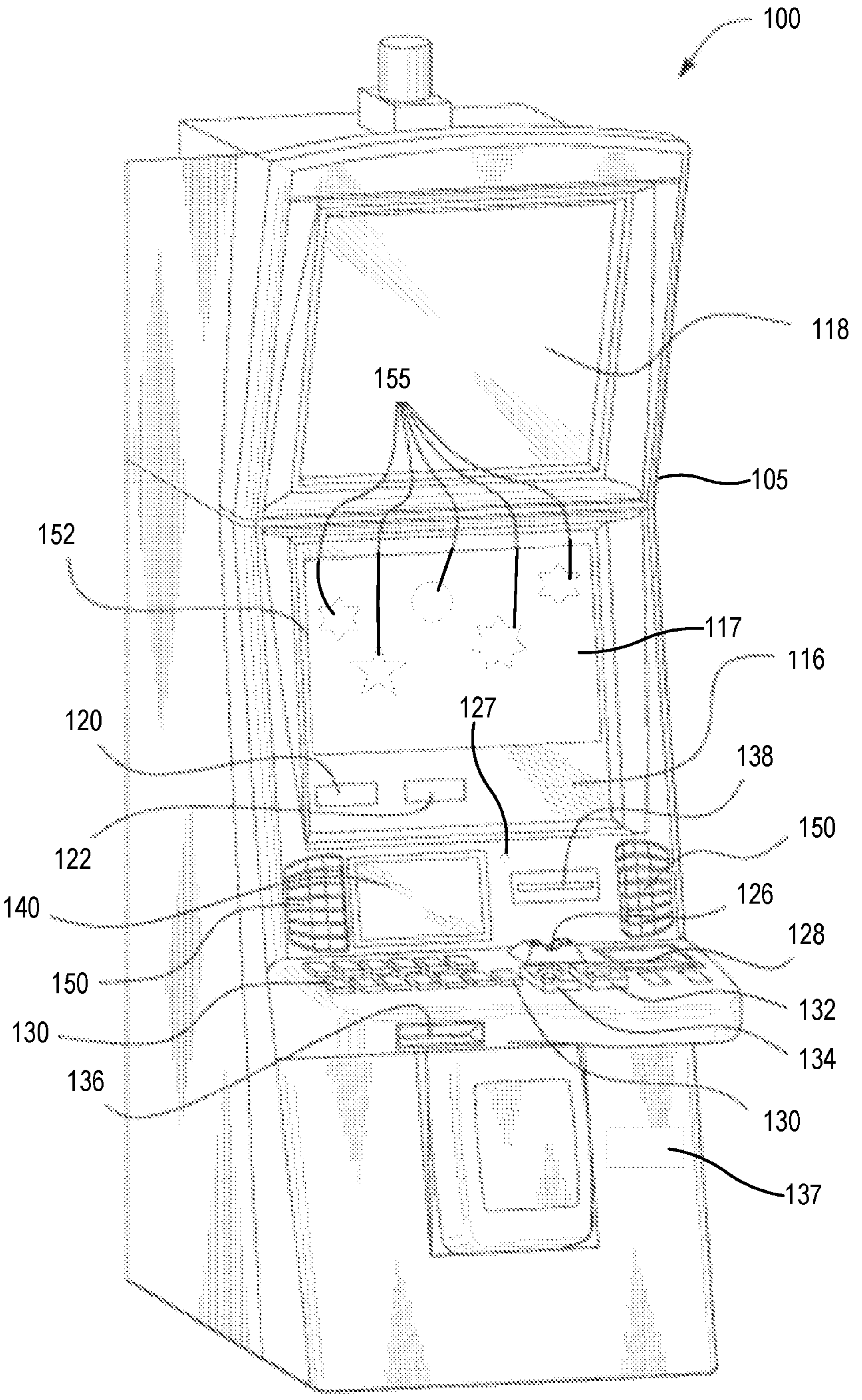
FIG. 2A is a perspective view of a gaming device that includes personalizable gesture inputs and that can be configured according to some embodiments.
Figure 2B:
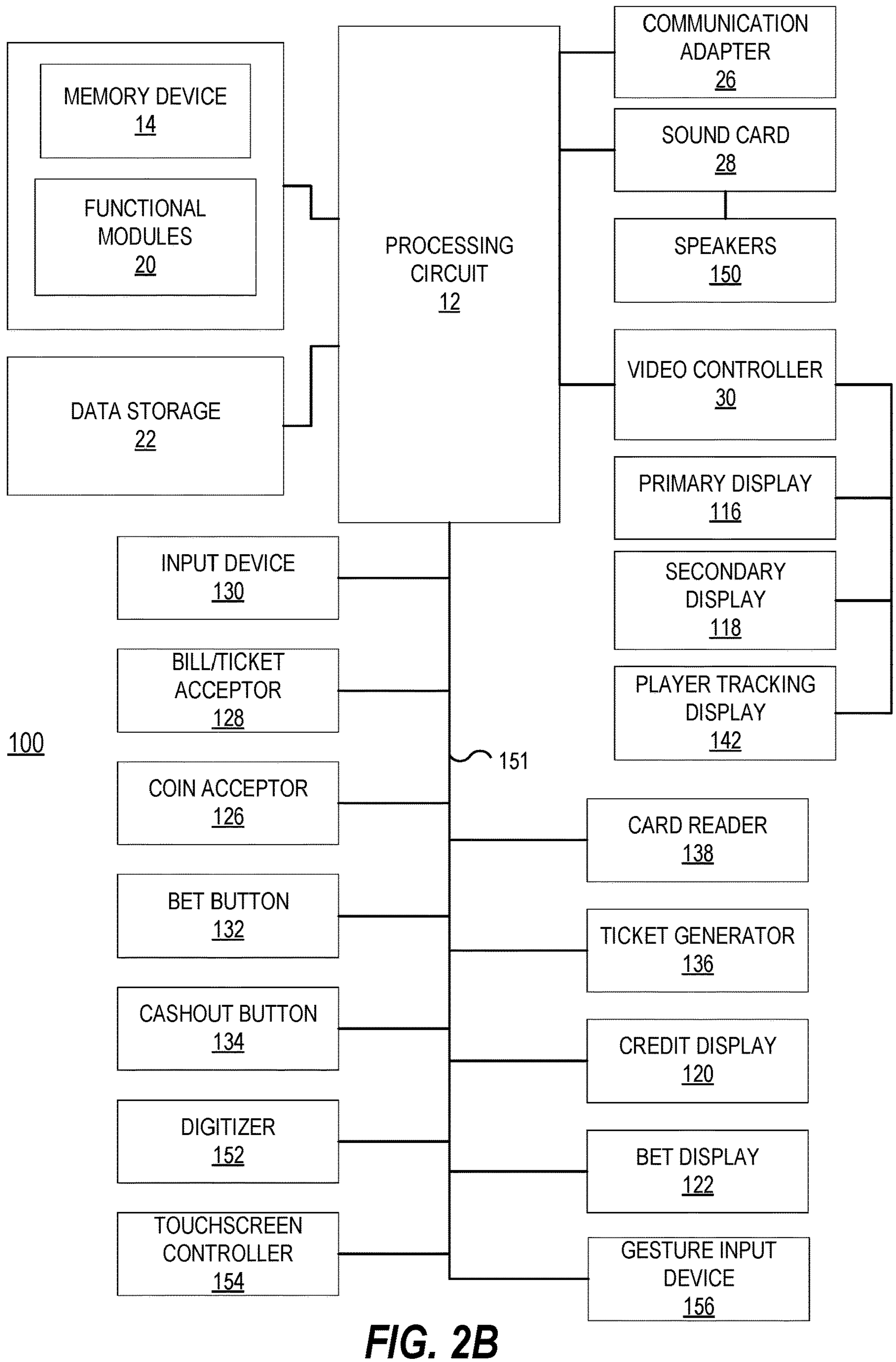
FIG. 2B is a schematic block diagram illustrating an electronic configuration for a gaming device that includes personalizable gesture inputs according to some embodiments.
Figure 2C:
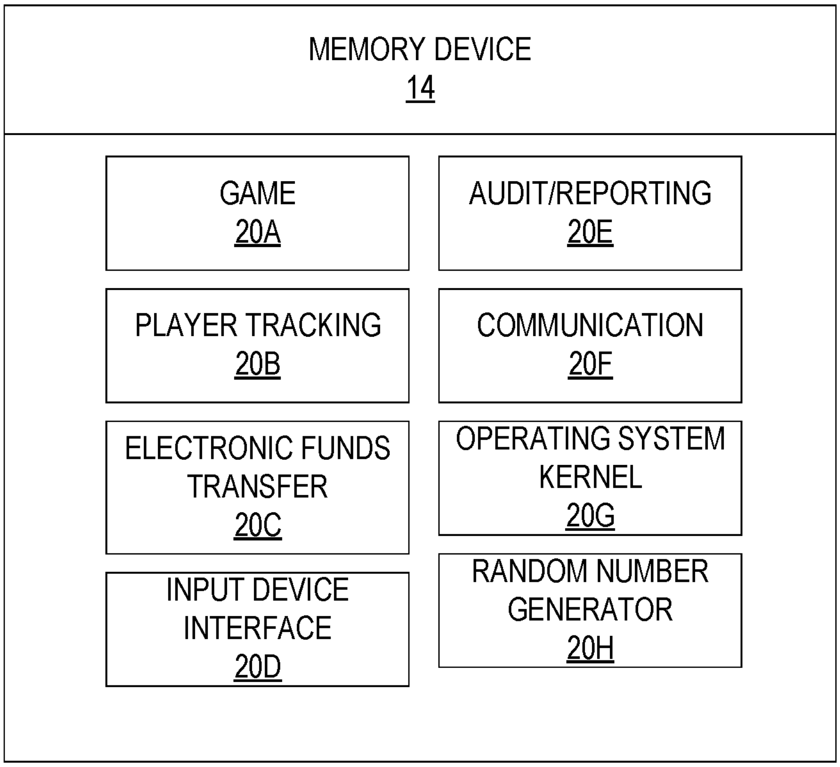
FIG. 2C is a schematic block diagram that illustrates various functional modules of a gaming device that includes personalizable gesture inputs according to some embodiments.

Embodiments herein may include different types of gaming devices. One example of a gaming device includes a gaming device 100 that can use gesture and/or touch-based inputs according to various embodiments is illustrated in FIGS. 2A, 2B, and 2C in which FIG. 2A is a perspective view of a gaming device 100 illustrating various physical features of the device, FIG. 2B is a functional block diagram that schematically illustrates an electronic relationship of various elements of the gaming device 100, and FIG. 2C illustrates various functional modules that can be stored in a memory device of the gaming device 100. The embodiments shown in FIGS. 2A to 2C are provided as examples for illustrative purposes only. It will be appreciated that gaming devices may come in many different shapes, sizes, layouts, form factors, and configurations, and with varying numbers and types of input and output devices, and that embodiments are not limited to the particular gaming device structures described herein.

Gaming devices 100 typically include a number of standard features, many of which are illustrated in FIGS. 2A and 2B. For example, referring to FIG. 2A, a gaming device 100 may include a support structure, housing 105 (e.g., cabinet) which provides support for a plurality of displays, inputs, outputs, controls and other features that enable a player to interact with the gaming device 100.

The gaming device 100 illustrated in FIG. 2A includes a number of display devices, including a primary display device 116 located in a central portion of the housing 105 and a secondary display device 118 located in an upper portion of the housing 105. A plurality of game components 155 are displayed on a display screen 117 of the primary display device 116. It will be appreciated that one or more of the display devices 116, 118 may be omitted, or that the display devices 116, 118 may be combined into a single display device. The gaming device 100 may further include a player tracking display 142, a credit display 120, and a bet display 122. The credit display 120 displays a player's current number of credits, cash, account balance or the equivalent. The bet display 122 displays a player's amount wagered. Locations of these displays are merely illustrative as any of these displays may be located anywhere on the gaming device 100.

The player tracking display 142 may be used to display a service window that allows the player to interact with, for example, their player loyalty account to obtain features, bonuses, comps, etc. In other embodiments, additional display screens may be provided beyond those illustrated in FIG. 2A. In some embodiments, one or more of the player tracking display 142, the credit display 120 and the bet display 122 may be displayed in one or more portions of one or more other displays that display other game related visual content. For example, one or more of the player tracking display 142, the credit display 120 and the bet display 122 may be displayed in a picture in a picture on one or more displays.

The gaming device 100 may further include a number of input devices 130 that allow a player to provide various inputs to the gaming device 100, either before, during or after a game has been played. The gaming device may further include a game play initiation button 132 and a cashout button 134. The cashout button 134 is utilized to receive a cash payment or any other suitable form of payment corresponding to a quantity of remaining credits of a credit display.

In some embodiments, one or more input devices of the gaming device 100 are one or more game play activation devices that are each used to initiate a play of a game on the gaming device 100 or a sequence of events associated with the gaming device 100 following appropriate funding of the gaming device 100. The example gaming device 100 illustrated in FIGS. 2A and 2B includes a game play activation device in the form of a game play initiation button 132. It should be appreciated that, in other embodiments, the gaming device 100 begins game play automatically upon appropriate funding rather than upon utilization of the game play activation device.

In some embodiments, one or more input device 130 of the gaming device 100 may include wagering or betting functionality. For example, a maximum wagering or betting function may be provided that, when utilized, causes a maximum wager to be placed. Another such wagering or betting function is a repeat the bet device that, when utilized, causes the previously-placed wager to be placed. A further such wagering or betting function is a bet one function. A bet is placed upon utilization of the bet one function. The bet is increased by one credit each time the bet one device is utilized. Upon the utilization of the bet one function, a quantity of credits shown in a credit display (as described below) decreases by one, and a number of credits shown in a bet display (as described below) increases by one.

In some embodiments, as shown in FIG. 2B, the input device(s) 130 may include and/or interact with additional components, such as gesture input sensor for a gesture input device 172, and/or a touch-sensitive display that includes a digitizer 152 and a touchscreen controller 154 for touch input devices, as disclosed herein. The player may interact with the gaming device 100 by touching virtual buttons on one or more of the display devices 116, 118, 140. Accordingly, any of the above described input devices, such as the input device 130, the game play initiation button 132 and/or the cashout button 134 may be provided as virtual buttons or regions on one or more of the display devices 116, 118, 140.

Referring briefly to FIG. 2B, operation of the primary display device 116, the secondary display device 118 and the player tracking display 142 may be controlled by a video controller 30 that receives video data from a processing circuit 12 or directly from a memory device 14 and displays the video data on the display screen. The credit display 120 and the bet display 122 are typically implemented as simple liquid crystal display (LCD) or light emitting diode (LED) displays that display a number of credits available for wagering and a number of credits being wagered on a particular game. Accordingly, the credit display 120 and the bet display 122 may be driven directly by the processing circuit 12. In some embodiments however, the credit display 120 and/or the bet display 122 may be driven by the video controller 30.

Referring again to FIG. 2A, the display devices 116, 118, 140 may include, without limitation: a cathode ray tube, a plasma display, an LCD, a display based on LEDs, a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display devices 116, 118, 140 may include a touch-screen with an associated touchscreen controller 154 and digitizer 152. The display devices 116, 118, 140 may be of any suitable size, shape, and/or configuration. The display devices 116, 118, 140 may include flat or curved display surfaces.

The display devices 116, 118, 140 and video controller 30 of the gaming device 100 are generally configured to display one or more game and/or non-game images, symbols, and indicia. In certain embodiments, the display devices 116, 118, 140 of the gaming device 100 are configured to display any suitable visual representation or exhibition of the movement of objects; dynamic lighting; video images; images of people, characters, places, things, and faces of cards; and the like. In certain embodiments, the display devices 116, 118, 140 of the gaming device 100 are configured to display one or more virtual reels, one or more virtual wheels, and/or one or more virtual dice. In other embodiments, certain of the displayed images, symbols, and indicia are in mechanical form. That is, in these embodiments, the display device 116, 118, 140 includes any electromechanical device, such as one or more rotatable wheels, one or more reels, and/or one or more dice, configured to display at least one or a plurality of game or other suitable images, symbols, or indicia.

The gaming device 100 also includes various features that enable a player to deposit credits in the gaming device 100 and withdraw credits from the gaming device 100, such as in the form of a payout of winnings, credits, etc. For example, the gaming device 100 may include a bill/ticket dispenser 136, a bill/ticket acceptor 128, and a coin acceptor 126 that allows the player to deposit coins into the gaming device 100.

As illustrated in FIG. 2A, the gaming device 100 may also include a currency dispenser 137 that may include a note dispenser configured to dispense paper currency and/or a coin generator configured to dispense coins or tokens in a coin payout tray.

The gaming device 100 may further include one or more speakers 150 controlled by one or more sound cards 28 (FIG. 2B). The gaming device 100 illustrated in FIG. 2A includes a pair of speakers 150. In other embodiments, additional speakers, such as surround sound speakers, may be provided within or on the housing 105. Moreover, the gaming device 100 may include built-in seating with integrated headrest speakers.

In various embodiments, the gaming device 100 may generate dynamic sounds coupled with attractive multimedia images displayed on one or more of the display devices 116, 118, 140 to provide an audio-visual representation or to otherwise display full-motion video with sound to attract players to the gaming device 100 and/or to engage the player during gameplay. In certain embodiments, the gaming device 100 may display a sequence of audio and/or visual attraction messages during idle periods to attract potential players to the gaming device 100. The videos may be customized to provide any appropriate information.

The gaming device 100 may further include a card reader 138 that is configured to read magnetic stripe cards, such as player loyalty/tracking cards, chip cards, and the like. In some embodiments, a player may insert an identification card into a card reader of the gaming device. In some embodiments, the identification card is a smart card having a programmed microchip or a magnetic strip coded with a player's identification, credit totals (or related data) and other relevant information. In other embodiments, a player may carry a portable device, such as a cell phone, a radio frequency identification tag or any other suitable wireless device, which communicates a player's identification, credit totals (or related data) and other relevant information to the gaming device. In some embodiments, money may be transferred to a gaming device through electronic funds transfer. When a player funds the gaming device, the processing circuit determines the amount of funds entered and displays the corresponding amount on the credit or other suitable display as described above.

In some embodiments, the gaming device 100 may include an electronic payout device or module configured to fund an electronically recordable identification card or smart card or a bank or other account via an electronic funds transfer to or from the gaming device 100.

FIG. 2B is a block diagram that illustrates logical and functional relationships between various components of a gaming device 100. It should also be understood that components described in FIG. 2B may also be used in other computing devices, as desired, such as mobile computing devices for example. As shown in FIG. 2B, the gaming device 100 may include a processing circuit 12 that controls operations of the gaming device 100. Although illustrated as a single processing circuit, multiple special purpose and/or general purpose processors and/or processor cores may be provided in the gaming device 100. For example, the gaming device 100 may include one or more of a video processor, a signal processor, a sound processor and/or a communication controller that performs one or more control functions within the gaming device 100. The processing circuit 12 may be variously referred to as a "controller," "microcontroller," "microprocessor" or simply a "computer." The processor may further include one or more application-specific integrated circuits (ASICs).

Various components of the gaming device 100 are illustrated in FIG. 2B as being connected to the processing circuit 12. It will be appreciated that the components may be connected to the processing circuit 12 through a system bus 151, a communication bus and controller, such as a universal serial bus (USB) controller and USB bus, a network interface, or any other suitable type of connection.

The gaming device 100 further includes a memory device 14 that stores one or more functional modules 20. Various functional modules 20 of the gaming device 100 will be described in more detail below in connection with FIG. 2C.

The memory device 14 may store program code and instructions, executable by the processing circuit 12, to control the gaming device 100. The memory device 14 may also store other data such as image data, event data, player input data, random or pseudo-random number generators, pay-table data or information and applicable game rules that relate to the play of the gaming device. The memory device 14 may include random access memory (RAM), which can include non-volatile RAM (NVRAM), magnetic RAM (ARAM), ferroelectric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The gaming device 100 may further include a data storage 22, such as a hard disk drive or flash memory. The data storage 22 may store program data, player data, audit trail data or any other type of data. The data storage 22 may include a detachable or removable memory device, including, but not limited to, a suitable cartridge, disk, CD ROM, DVD or USB memory device.

The gaming device 100 may include a communication adapter 26 that enables the gaming device 100 to communicate with remote devices over a wired and/or wireless communication network, such as a local area network (LAN), wide area network (WAN), cellular communication network, or other data communication network. The communication adapter 26 may further include circuitry for supporting short range wireless communication protocols, such as Bluetooth and/or NFC that enable the gaming device 100 to communicate, for example, with a mobile communication device operated by a player.

The gaming device 100 may include one or more internal or external communication ports that enable the processing circuit 12 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, Small Computer System Interface ("SCSI") ports, solenoids, speakers, thumb drives, ticket readers, touch screens, trackballs, touchpads, wheels, and wireless communication devices. In some embodiments, internal or external peripheral devices may communicate with the processing circuit through a USB hub (not shown) connected to the processing circuit 12.

In some embodiments, the gaming device 100 may include a sensor, such as a camera 127, in communication with the processing circuit 12 (and possibly controlled by the processing circuit 12) that is selectively positioned to acquire an image of a player actively using the gaming device 100 and/or the surrounding area of the gaming device 100. In one embodiment, the camera 127 may be configured to selectively acquire still or moving (e.g., video) images and may be configured to acquire the images in either an analog, digital or other suitable format. The display devices 116, 118, 140 may be configured to display the image acquired by the camera 127 as well as display the visible manifestation of the game in split screen or picture-in-picture fashion. For example, the camera 127 may acquire an image of the player and the processing circuit 12 may incorporate that image into the primary and/or secondary game as a game image, symbol or indicia.

Various functional modules of that may be stored in a memory device 14 of a gaming device 100 are illustrated in FIG. 2C. Referring to FIG. 2C, the gaming device 100 may include in the memory device 14 a game module 20A that includes program instructions and/or data for operating a hybrid wagering game as described herein. The gaming device 100 may further include a player tracking module 20B, an electronic funds transfer module 20C, an input device interface 20D, an audit/reporting module 20E, a communication module 20F, an operating system kernel 20G and a random number generator 20H. The player tracking module 20B keeps track of the play of a player. The electronic funds transfer module 20C communicates with a back end server or financial institution to transfer funds to and from an account associated with the player. The input device interface 20D interacts with input devices, such as the input device 130, as described in more detail below. The communication module 20F enables the gaming device 100 to communicate with remote servers and other gaming devices using various secure communication interfaces. The operating system kernel 20G controls the overall operation of the gaming device 100, including the loading and operation of other modules. The random number generator 20H generates random or pseudorandom numbers for use in the operation of the hybrid games described herein.

In some embodiments, a gaming device 100 comprises a personal device, such as a desktop computer, a laptop computer, a mobile device, a tablet computer or computing device, a personal digital assistant (PDA), or other portable computing devices. In some embodiments, the gaming device 100 may be operable over a wireless network, such as part of a wireless gaming system. In such embodiments, the gaming machine may be a hand-held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

Figure 2D:
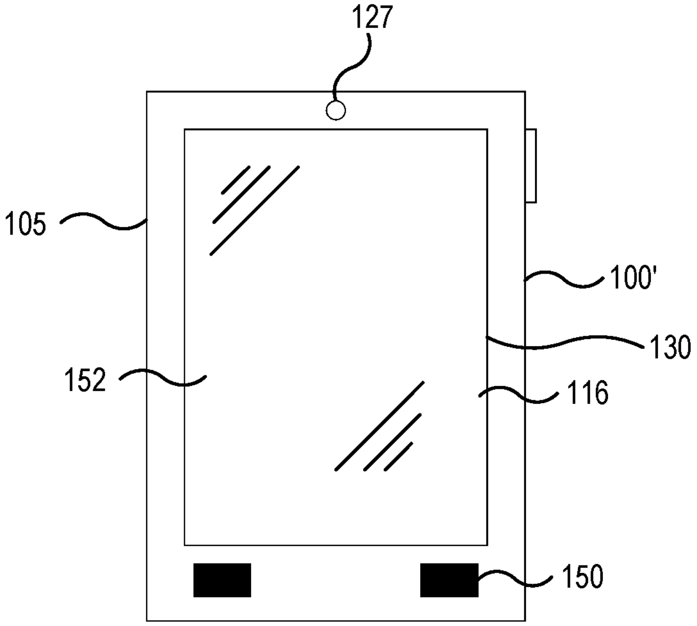
FIG. 2D is perspective view of a gaming device that includes personalizable gesture inputs that can be configured according to some embodiments.

For example, referring to FIG. 2D, a gaming device 100' may be implemented as a handheld device including a compact housing 105 on which is mounted a touchscreen display device 116 including a digitizer 152. As described in greater detail with respect to FIG. 3 below, one or more input devices 130 may be included for providing functionality of for embodiments described herein. A camera 127 may be provided in a front face of the housing 105. The housing 105 may include one or more speakers 150. In the gaming device 100', various input buttons described above, such as the cashout button, gameplay activation button, etc., may be implemented as soft buttons on the touchscreen display device 116 and/or input device 130. In this embodiment, the input device 130 is integrated into the touchscreen display device 116, but it should be understood that the input device may also, or alternatively, be separate from the display device 116. Moreover, the gaming device 100' may omit certain features, such as a bill acceptor, a ticket generator, a coin acceptor or dispenser, a card reader, secondary displays, a bet display, a credit display, etc. Credits can be deposited in or transferred from the gaming device 100' electronically.

Figure 2E:
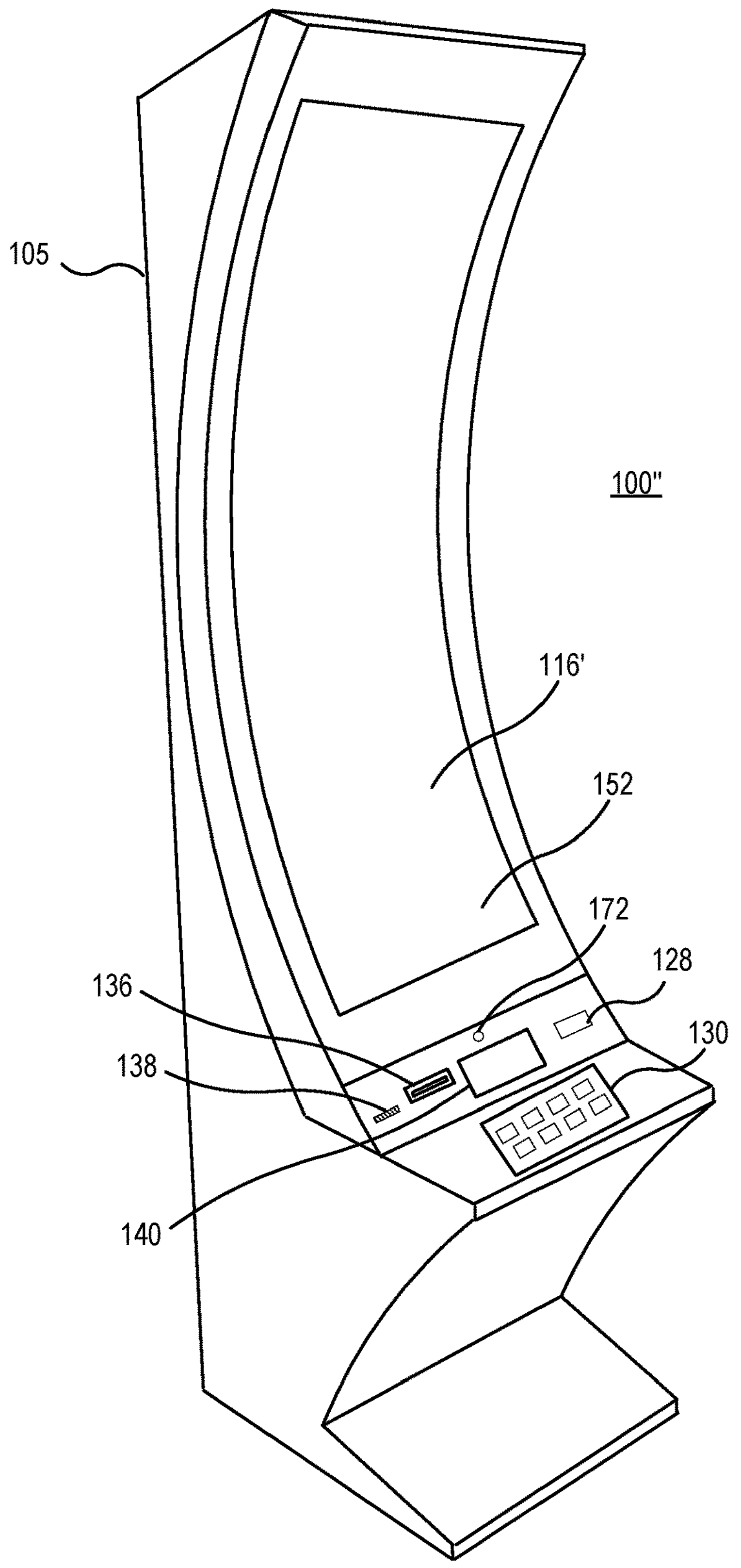
FIG. 2E is a perspective view of a gaming device that includes personalizable gesture inputs according to further embodiments.

FIG. 2E illustrates a standalone gaming device 100" having a different form factor from the gaming device 100 illustrated in FIG. 2A. In particular, the gaming device 100" is characterized by having a large, high aspect ratio, curved primary display device 116' provided in the housing 105, with no secondary display device. The primary display device 116' may include a digitizer 152 to allow touchscreen interaction with the primary display device 116'. The gaming device 100" may further include a player tracking display 142, an input device 130, a bill/ticket acceptor 128, a card reader 138, and a bill/ticket dispenser 136. The gaming device 100" may further include one or more gesture input devices 172 to enable gesture control of the gaming device 100".

Although illustrated as certain gaming devices, such as electronic gaming machines (EGMs) and mobile devices, functions and/or operations as described herein may also include wagering stations that may include electronic game tables, conventional game tables including those involving cards, dice and/or roulette, and/or other wagering stations such as sports book stations, video poker games, skill-based games, virtual casino-style table games, or other casino or non-casino style games. Further, gaming devices according to embodiments herein may be implemented using other computing devices and mobile devices, such as smart phones, tablets, and/or personal computers, among others.

Input Device Features

Figure 3:
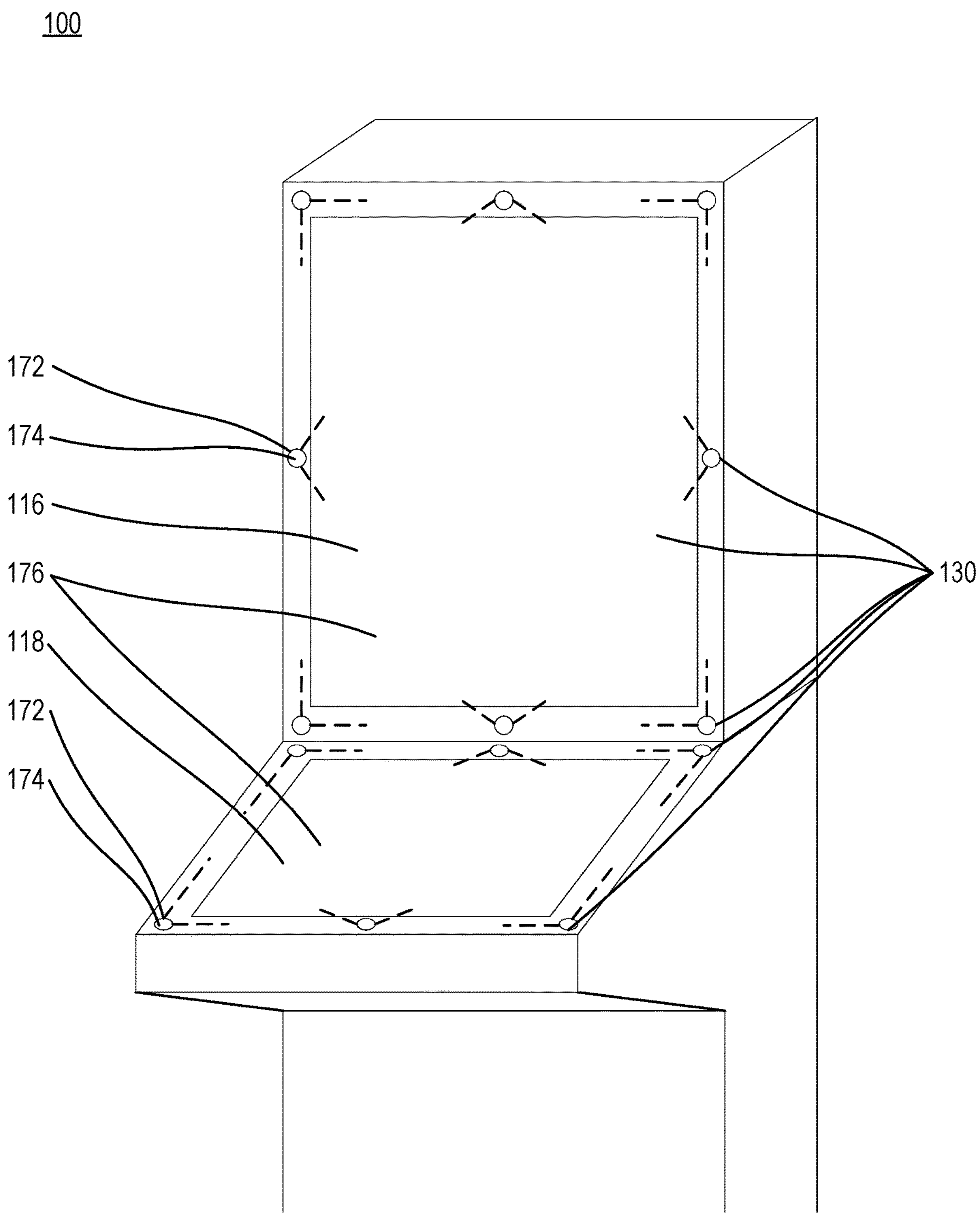
FIG. 3 is a diagram of a gaming device having gesture input devices to detect player gesture at the gaming device, according to some embodiments.

Referring now to FIG. 3, a gaming device 100 having a plurality of input devices 130 is illustrated according to an embodiment. In this embodiment, the input devices 130 include gesture input devices 172 including a plurality of gesture sensors 174 to detect player gestures associated with the gaming device 100. The input devices 130 also include touchscreen input devices 176 for detecting touch input at the display devices 116, 118.

The gesture sensors 174 are arranged around the primary display device 116 and the secondary display device 118 in order to detect gestures associated with user interface elements of the display devices 116, 118. For example, each gesture sensor 174 may provide a gesture input value corresponding to the gesture performed by the player. The gesture sensors 174 may include ultrasonic sensors, optical (e.g., infrared) sensors, image capture devices, and/or other suitable sensors for detecting gestures associated with the gaming device 100. In some embodiments, the gesture sensors 174 may include three dimensional (3D) gesture input sensors to detect a 3D gesture performed by the player, with each 3D gesture input sensor providing a 3D gesture input value corresponding to the 3D gesture performed by the player.

Other Gaming Device Features

Embodiments described herein may be implemented in various configurations for gaming devices 100*s*, including but not limited to: (1) a dedicated gaming device, wherein the computerized instructions for controlling any games (which are provided by the gaming device) are provided with the gaming device prior to delivery to a gaming establishment; and (2) a changeable gaming device, where the computerized instructions for controlling any games (which are provided by the gaming device) are downloadable to the gaming device through a data network when the gaming device is in a gaming establishment. In some embodiments, the computerized instructions for controlling any games are executed by at least one central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In some embodiments, a gaming device may be operated by a mobile device, such as a mobile telephone, tablet other mobile computing device. For example, a mobile device may be communicatively coupled to a gaming device and may include a user interface that receives user inputs that are received to control the gaming device. The user inputs may be received by the gaming device via the mobile device.

In some embodiments, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more gaming devices; and/or (c) one or more personal gaming devices, such as desktop computers, laptop computers, tablet computers or computing devices, PDAs, mobile telephones such as smart phones, and other mobile computing devices.

In certain such embodiments, computerized instructions for controlling any games (such as any primary or base games and/or any secondary or bonus games) displayed by the gaming device are executed by the central server, central controller, or remote host. In such "thin client" embodiments, the central server, central controller, or remote host remotely controls any games (or other suitable interfaces) displayed by the gaming device, and the gaming device is utilized to display such games (or suitable interfaces) and to receive one or more inputs or commands. In other such embodiments, computerized instructions for controlling any games displayed by the gaming device are communicated from the central server, central controller, or remote host to the gaming device and are stored in at least one memory device of the gaming device. In such "thick client" embodiments, the at least one processor of the gaming device executes the computerized instructions to control any games (or other suitable interfaces) displayed by the gaming device.

In some embodiments in which the gaming system includes: (a) a gaming device configured to communicate with a central server, central controller, or remote host through a data network; and/or (b) a plurality of gaming devices configured to communicate with one another through a data network, the data network is an internet or an intranet. In certain such embodiments, an internet browser of the gaming device is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the gaming device, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the gaming device.

It should be appreciated that the central server, central controller, or remote host and the gaming device are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of gaming devices to play games from an everincreasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

Figure 4:
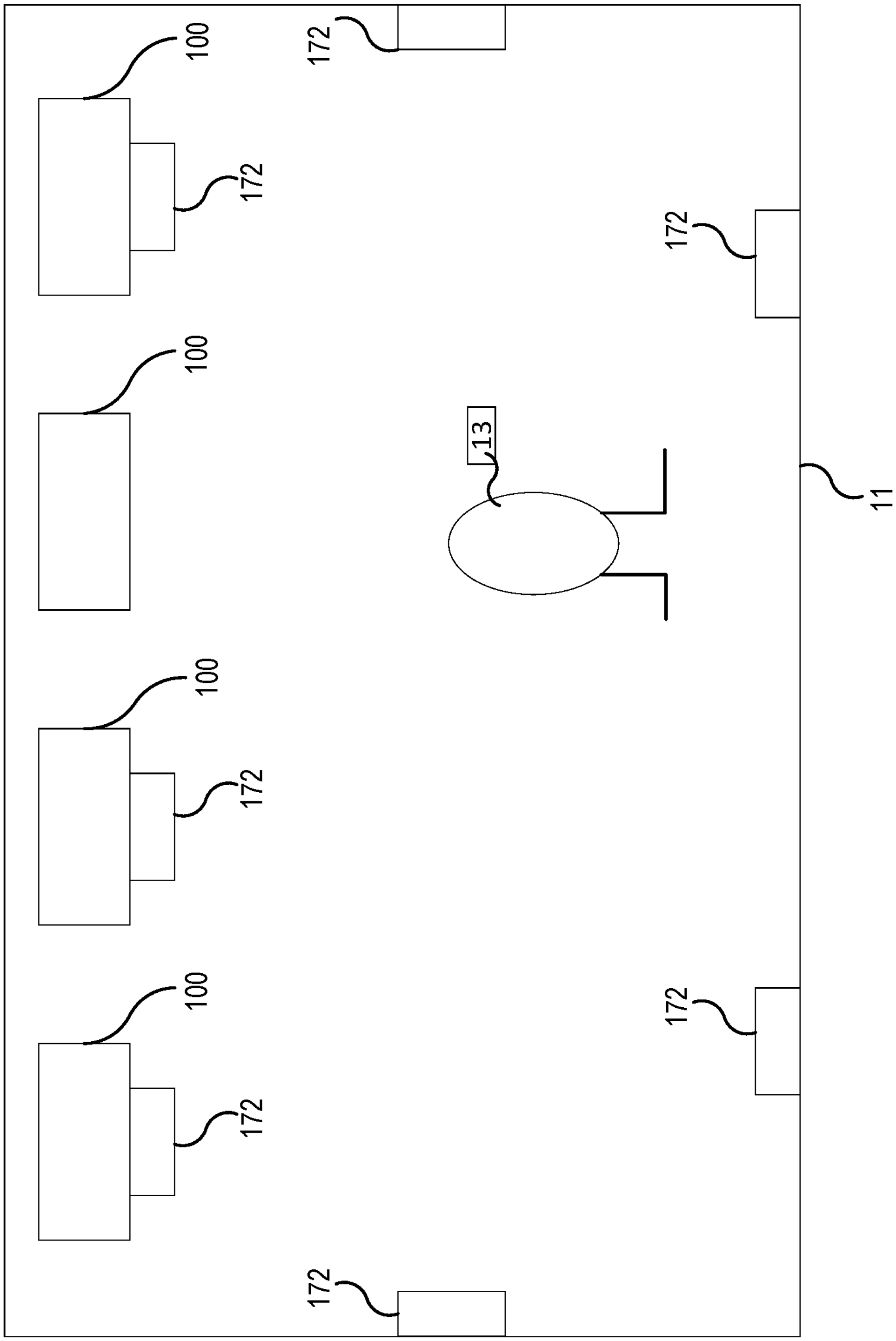
FIG. 4 is a schematic block diagram illustrating a system including a gesture input device that is remote from the gaming device according to some embodiments.

Reference is now made to FIG. 4, which is a schematic block diagram illustrating a system including a gesture input device that is remote from the gaming device according to some embodiments. As illustrated, a plurality of EGMS 100 may be arranged around the floor and/or portion thereof in a casino 11. Some embodiments provide that each of the EGMs 100 includes a gesture input device 172 as a component therein. As illustrated, the casino 11 may include EGMs 100 that do not include a gesture input device 172 as a component therein. Some embodiments provide that one or more gesture input devices 172 may be provided in locations that are not included in or proximate to one or more EGMs 100. For example, gesture input devices 172 may be mounted to walls, ceilings and/or other structures in the casino 11.

Some embodiments provide that the gestures may be received by one or more of the gesture input devices 172 that are separate from the EGMS 100 and/or components of the EGMs 100. In some embodiments, a user 13, such as a technician may perform a user specific gesture that is received by more than one of the EGMs 100. For example, a technician may simultaneously direct a specific operation to each of multiple EGMs 100 in a bank of proximately located EGMs 100.

In some embodiments, a user 13 may see a particular EGM 100 that is across the casino 11 and that is not being used by another patron of the casino. In such cases, the user 13 may perform a user specific gesture that causes a message to be received by the particular EGM 100. In response, the EGM 100 may change to a reserved status for a given period of time to allow the user 13 to get to the EGM 100 to play.

Figure 5:
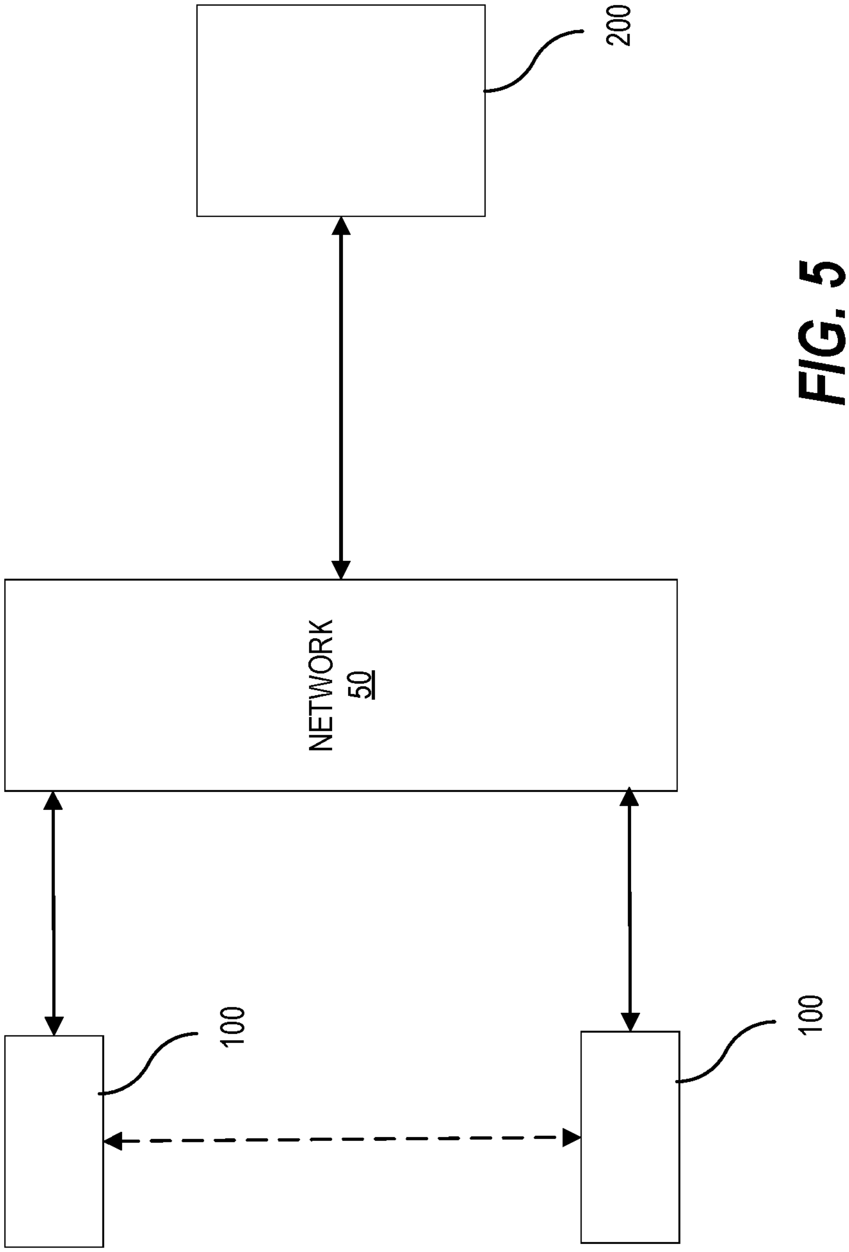
FIG. 5 is a schematic block diagram illustrating a system including a personalized gesture library according to some embodiments.

Reference is now made to FIG. 5, which is a schematic block diagram illustrating a system including a personalized gesture library according to some embodiments. In some embodiments, an EGM 100 may include a personalized gesture library 200 that includes gesture input values corresponding to user specific gestures. The gesture input values may be associated with corresponding gaming device operations. In some embodiments, the personalized gesture library 200 may store the gesture input values in association with identifiers that correspond to the given gaming device operations.

In some embodiments, the personalized gesture library 200 is not a component of the EGM 100 and, instead, is located at a location other than proximate the EGMs 100. For example, while the EGMs 100 may be located in a casino, the personalized gesture library 200 may be at a different part of the casino and/or may be completely off-site relative to the casino. For example, some embodiments provide that the personalized gesture library 200 is stored in a remote server that may be cloud based and/or decentralized, among others. In such embodiments, the EGMs 100 may be communicatively coupled to the personalized gesture library 200 via a network 50 that may include wired and/or wireless communication technologies. In some embodiments, instances of the personalized gesture library 200 and/or portions thereof may also be stored on EGMs 100.

Figure 6:
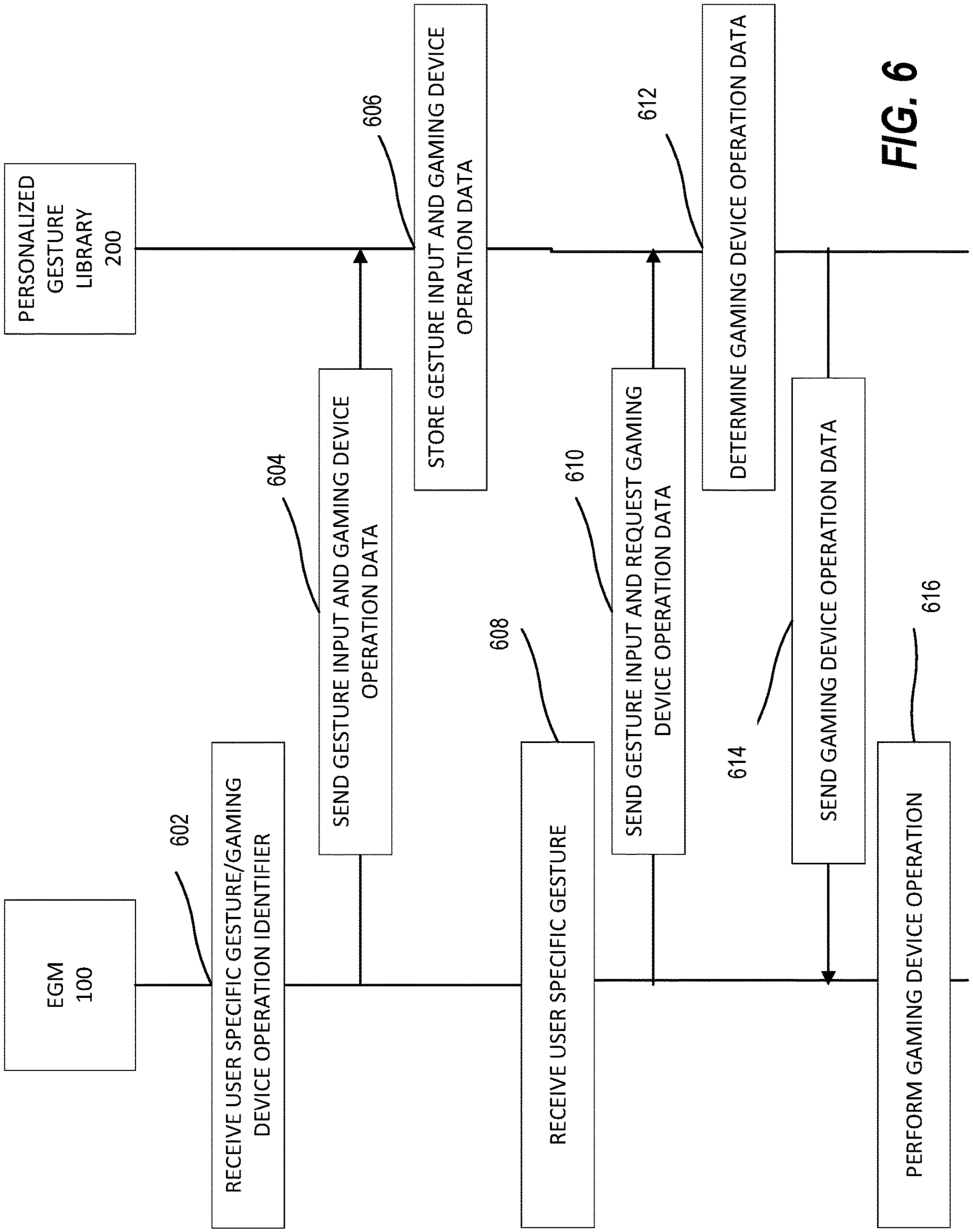
FIG. 6 is a schematic data flow diagram illustrating a data flow between a personalized gesture library and a gaming device according to some embodiments.

Some embodiments provide that communications with the personalized gesture library 200 may be performed to provide data corresponding to the user specific gesture to the personalized gesture recognition library 200. FIG. 6 is a schematic data flow diagram illustrating a data flow between a personalized gesture library and a gaming device according to some embodiments. In some embodiments, the EGM 100 may receive, from a user, an input as a user specific gesture and may associate such gesture with a gaming device operation (block 602). The EGM 100 may send data corresponding to the gesture input and the gaming device operation data to the personalized gesture library 200 (block 604).

The personalized gesture library 200 may store data corresponding to the gesture and the gaming device operation data (block 606). Some embodiments provide that such operations may be performed as a training operation to train the EGM 100 and/or the personalized gesture library 200. Once trained, the EGM 100 may receive, as an input, a user specific gesture (block 608) and send the gesture input and a request for data corresponding to a gaming device operation. The personalized gesture library 200 may determine the gaming device operation data based on the received gesture input (block 612) and send the gaming device operation data to the EGM 100 (block 614). The EGM may then perform the gaming device operation that corresponds to the user specific gesture (block 616).

Figure 7:
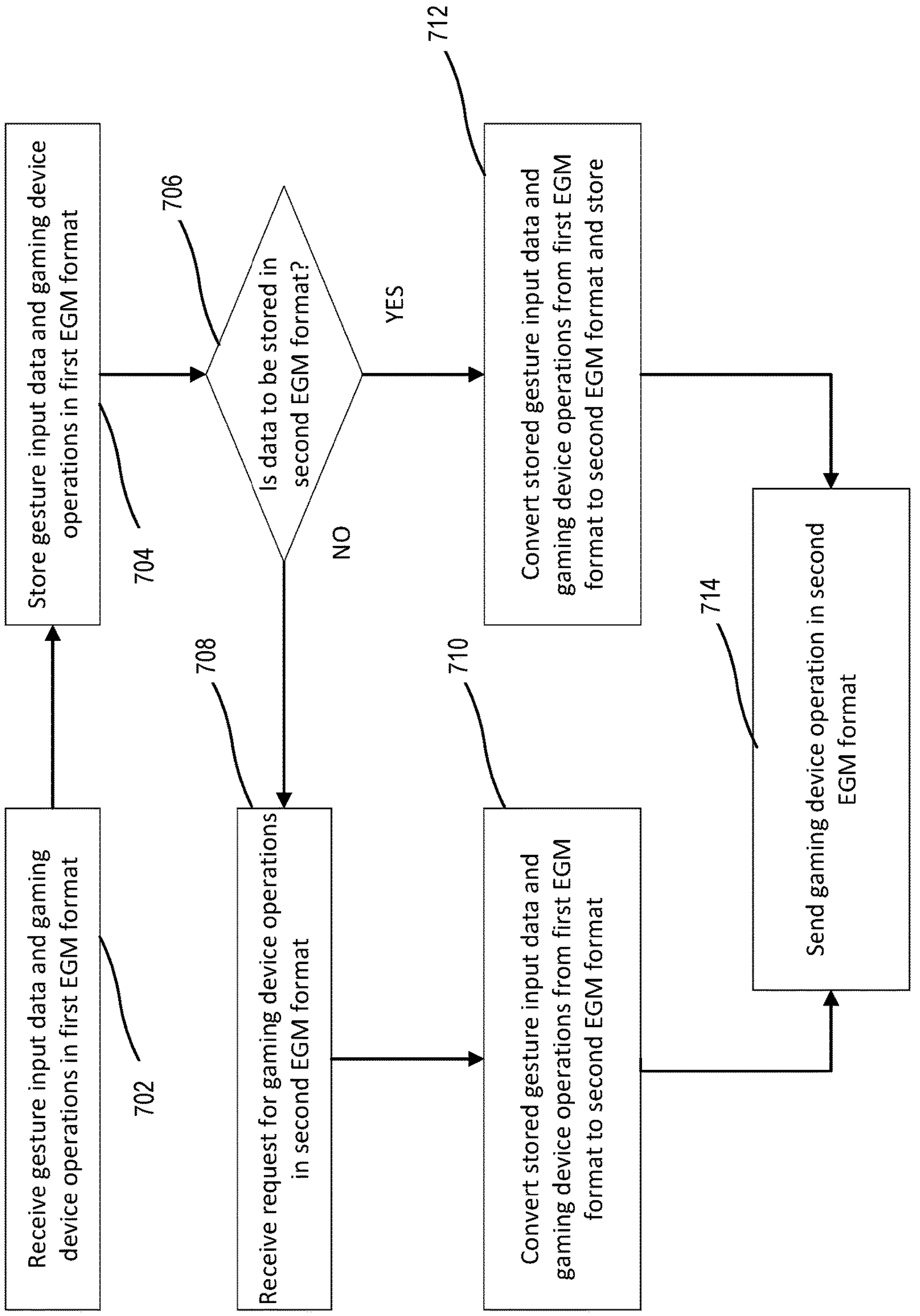
FIG. 7 is a schematic block diagram illustrating a system including a multiple format personalized gesture library according to some embodiments.

In some embodiments, gesture input values and/or gaming device operations may vary in format and/or content based on a variance of different EGM capabilities. For example, reference is now made to FIG. 7, which is a schematic block diagram illustrating a system including a multiple format personalized gesture library according to some embodiments. In some embodiments, different EGMs 100 may use different data formats for gesture inputs and/or for identifying the gaming device operations. In some embodiments, the personalized gesture library may maintain the same user specific gesture in multiple different EGM formats. In this manner, the user specific gestures may be functional for a player from game session to game session and/or from EGM to EGM. Some embodiments provide the personalized gesture library 200 receives gesture input data and/or gaming device operations expressed in a first EGM format (block 702). The gesture input data and the corresponding gaming device operations may be stored in the first EGM format (block 704). It may be determined whether the data is to be stored in a second EGM format (block 706). The different EGM formats may include different variables, fields, values, value ranges and/or information content, among others. If the data is to be stored in the second EGM format then the stored gesture input data and gaming device operations may be converted from the first EGM format to the second EGM format and stored (block 712).

If the second EGM format data is not to be stored, then the personalized gesture library may wait for a request before converting the data to the second format. In such cases, a request for gaming device operations in the second EGNM format may be received (block 708). In response, the stored gesture input data and gaming device operations may be converted from the first EGM format to the second EGM format (block 710). The gaming device operation data may then be sent to the EGM in the second EGM format (block 714). Although not illustrated, some embodiments provide that only a portion of the stored user specific gestures may be converted to different EGM format based in advance of a request therefor while other user specific gestures may only be converted to a different EGM format upon request.

Figure 8:
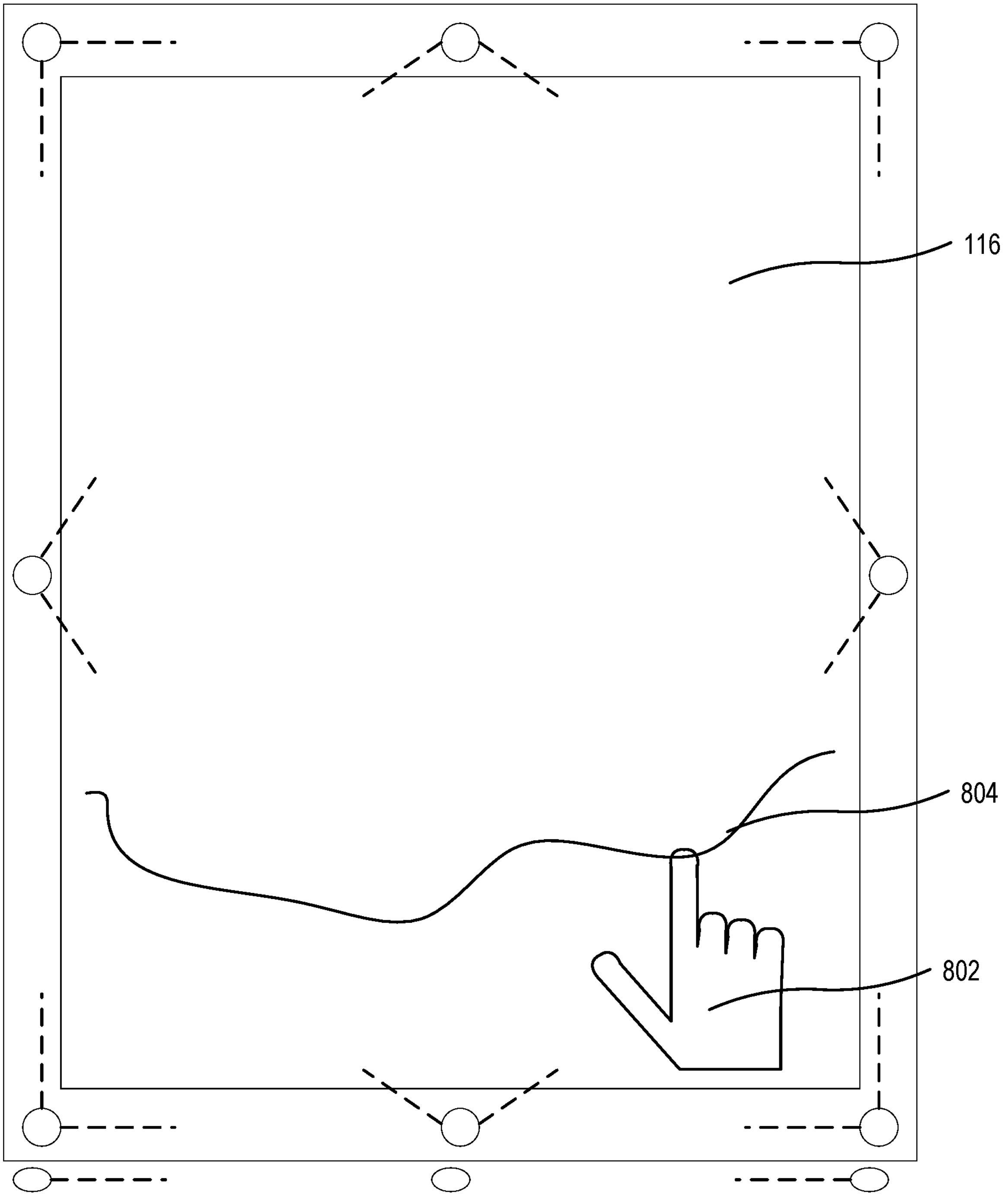
FIG. 8 is a schematic block diagram illustrating a system configured to receive a gesture input corresponding to a data graphic that represents a property of operation of a gaming device according to some embodiments.

In some embodiments, the gaming device operation may correspond to adjustments to the game operation and/or to the gaming environment. For example, brief reference is now made to FIG. 8 is a schematic block diagram illustrating a system configured to receive a gesture input corresponding to a data graphic that represents a property of operation of a gaming device according to some embodiments. As illustrated, the primary display 116 of an EGM 100 may display one or more data graphics 804 for providing a visual representation of gaming operation inputs and/or gaming environment inputs that may be modified by using a gesture input 802 to adjust the position of portions of the data graphic 804. In some embodiments, the data graphic 804 may represent a pay table selection that may be adjusted by the user by manipulating the data graphic 804. Some embodiments provide that the data graphic 804 may correspond to lighting at and/or near the EGM. For example, some players may experience color blindness and may be able to adjust the color scheme to one including mode discernable elements. Similarly, the data graphic 804 may represent a graphic equalizer that may be manipulated to let a player select a desired audio output performance.

Figure 9:
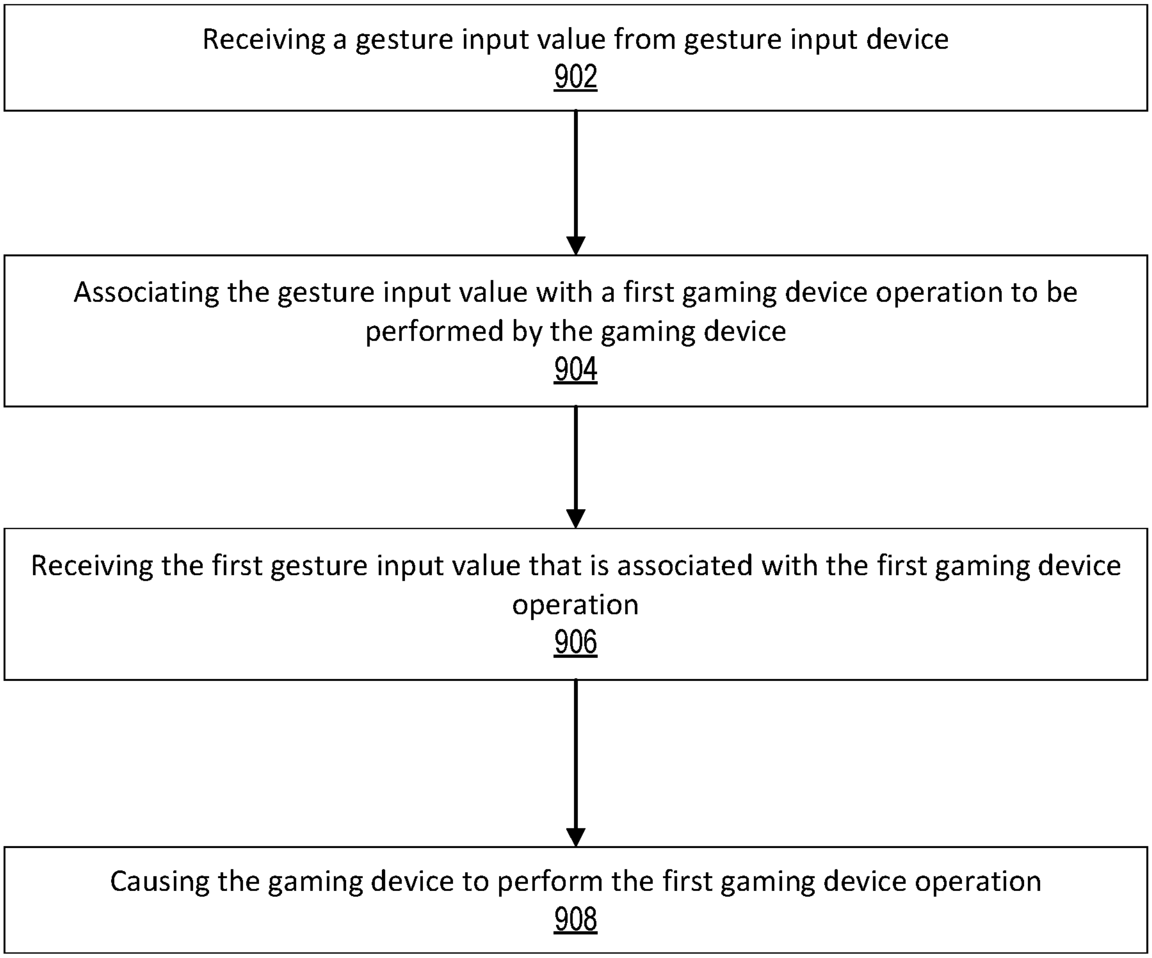
FIG. 9 is a flowchart illustrating operations of systems/methods/devices that include personalizable gesture inputs according to some embodiments.

Reference is now made to FIG. 9, which is a flowchart illustrating operations of systems/methods/devices that include personalizable gesture inputs according to some embodiments. For example, embodiments herein may be performed on a gaming device that includes a gesture input device to detect gesture inputs performed by a user, a processor circuit and a memory coupled to the processor circuit, the memory comprising machine-readable instructions that, when executed by the processor circuit, cause the processor circuit to perform such operations. Operations include receiving a first gesture input value from the first gesture input device (block 902). In some embodiments, the first gesture input corresponds to a user-specific gesture that the user performs.

Operations include associating the first gesture input value with a first gaming device operation to be performed by the gaming device (block 904). In some embodiments, these operations may constitute a training operation that may be performed based on the EGM prompting the user to perform and assign certain user specific gestures to cause a corresponding gaming device operation to be performed.

Operations include receiving the first gesture input value that is associated with the first gaming device operation (block 906). This operation may correspond to post training gestures. In response to receiving the first gesture input value that is associated with the first gaming device operation, operations may include causing the gaming device to perform the first gaming device operation (block 908).

In some embodiments, the instructions further cause the processor circuit to generate a personalized gesture library that includes multiple gesture input values that include the first gesture input value and that are associated with respective ones of multiple gaming device operations. In some embodiments, the personalized gesture library includes user identification data that is associated with corresponding ones of the gesture input values and the gaming device operations.

Some embodiments provide that the instructions further cause the processor circuit to perform a user identification operation to determine an identity of the user. Some embodiments provide that the user identification operation includes using the first gesture input value and receiving at least one other input corresponding to the user. Other inputs may include biometric inputs that may be used in combination with the user specific gesture input to identify the user.

Some embodiments provide that operations may provide a personalized gesture training output to the user to prompt the user to perform the user-specific gesture that corresponds to the first gesture input value and the first gaming device operation that is associated with the first gesture input value. In some embodiments, the personalized gesture training output further causes the processor circuit to provide, to the user, a sequence of gesture instructions that prompts the user to perform the user-specific gesture. In some embodiments, the sequence of instructions includes a game that the user plays. Some embodiments provide that the instructions further cause the processor circuit to provide, to the user, suggested gestures to be the user-specific gesture.

In some embodiments, the user-specific gesture includes a hand motion that corresponds to a data graphic that represents a property of operation of the gaming device. In some embodiments, the user-specific gesture causes the data graphic to be modified to adjust the property of operation of the gaming device. In some embodiments, the data graphic includes a pay table curve in which the property of operation of the gaming device includes game volatility. In this manner, the user-specific gesture may include the first gesture input value that causes the game volatility to be modified.

In some embodiments, the data graphic includes an environmental property corresponding to the gaming device and the user-specific gesture includes the first gesture input value that causes the environmental property to be modified.

In some embodiments, the processor circuit is caused to detect multiple gesture inputs that include multiple occurrences of a sequence of user-specific gestures. In some embodiments, responsive to detecting the sequence of user-specific gestures, the processor circuit is further caused to provide a message to the user that includes a suggestion to define the sequence of user-specific gestures as a single gesture.

Figure 10:
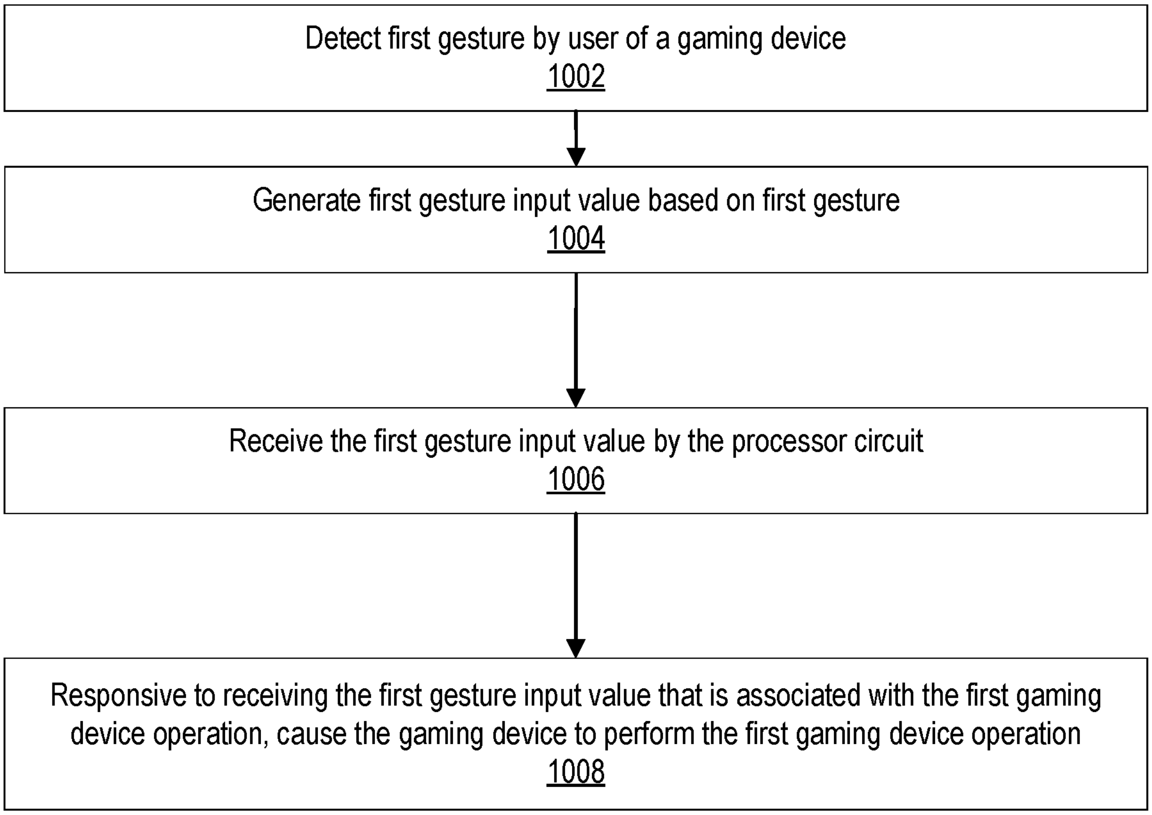
FIG. 10 is a flowchart illustrating operations of systems/methods/devices that include personalizable gesture inputs according to some embodiments.

Reference is now made to FIG. 10, which is a flowchart illustrating operations of systems/methods/devices that include personalizable gesture inputs according to some embodiments. For example, such systems may include a gesture input device to detect (block 1002) a first gesture by a user of a gaming device and to generate (block 1004) a first gesture input value based on the first gesture.

The system may include a processor circuit and a memory that is coupled to the processor circuit. The memory may include machine-readable instructions that, when executed by the processor circuit, cause the processor circuit to receive the first gesture input value from the gesture input device (block 1006). In some embodiments, the first gesture input value corresponds to a user-specific gesture that the user performs and that is associated with a first gaming operation of the gaming device. Some embodiments provide that the user-specific gesture is a gesture that has not been received by the gesture input device from any other player. As such, the user-specific gesture may be unique to the user. In response to receiving the first gesture input value, the gaming device may be caused to perform the first gaming operation that is associated with the first gesture input value (block 1008).

In some embodiments, the first gesture input device includes an image capture device that is remotely located from the gaming device. Some embodiments provide that there are multiple gaming devices and that, in response to receiving the first gesture input value, each of the multiple gaming devices is caused to perform the first gaming operation. Such embodiments may provide a technician and/or other operator may be able to interact with multiple EGMS simultaneously.

Some embodiments further include a data repository that includes a personalized gesture library that includes multiple gesture input values that are associated with respective ones of multiple different gaming device operations. In some embodiments, gesture data in the personalized gesture library may be associated with user specific data that may include personal data corresponding to the user and/or a unique identifier that corresponds with the user and that may be used to access the gesture and gaming device operations. In some embodiments, a user-specific gesture may be used either alone or in combination with other data to identify the user so that other user-specific gestures that are stored in the personalized gesture library may be used.

In some embodiments, ones of the gesture input values include different gesture input data formats corresponding using different types of gesture input devices on different gaming devices. For example, gesture input data corresponding to a first gaming device may be generated based on different fields, values, ranges, positions and/or device capabilities than gesture input data corresponding to a second gaming device. In some embodiments, the personalized library may provide translations of gesture input data from a first data format corresponding to the first gaming device to a second data format corresponding to the second gaming device.

In some embodiments, a first portion of the gesture input values are interpreted to respective ones of the different gesture input data formats prior to a request from the gaming device. In such embodiments, a second portion of the gesture input values are interpreted to respective ones of the different gesture input data formats in response to a request from the gaming device. Some embodiments provide that the data repository is located remote from the gaming device. In some embodiments, the first gesture input value is sent to the personalized gesture library and the first gaming operation that is associated with the first gesture input value is provided to the gaming device.

Figure 11:
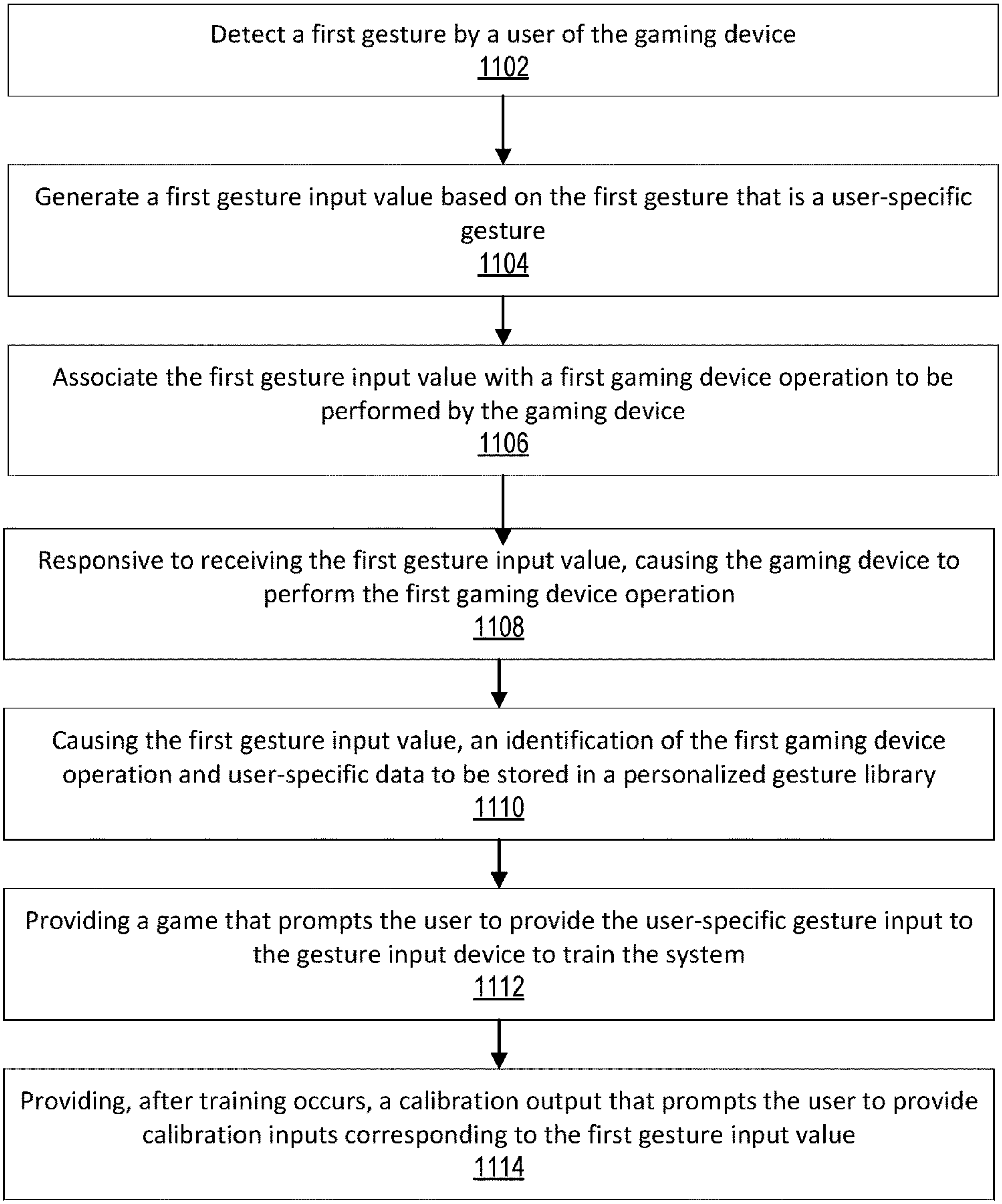
FIG. 11 is a flowchart illustrating operations of systems/methods/devices that include personalizable gesture inputs according to some embodiments.

Reference is now made to FIG. 11, which is a flowchart illustrating operations of systems/methods/devices that include personalizable gesture inputs according to some embodiments. Operations may include detecting (block 1102), by a gesture input device of a gaming device, a first gesture that is made by a user of the gaming device and generating (1104), by the gesture input device, a first gesture input value based on the first gesture. As provided herein, the first gesture may be a user-specific gesture that is unique to the user. Operations include associating the first gesture input value with a first gaming device operation (block 1106). In some embodiments, the first gaming device operation is one that may be performed by the gaming device in response to receiving the first gesture. As provided herein, the gaming device operations may include any number of operations that may be performed by the gaming device in response to an input from the user. Such operations may be related to gameplay, sequences of inputs, play mode, and/or environmental conditions such as lighting, audio, air flow and/or temperature among others.

Some embodiments provide that, in response to receiving the first gesture input value that is associated with the first gaming device operation, operations include causing the gaming device to perform the first gaming device operation (block 1108). Operations may further include causing the first gesture input value, an identification of the first gaming device operation and user-specific data to be stored in a personalized gesture library (block 1110). In some embodiments, the personalized gesture library may be accessible to other gaming devices and may include a persistent store of the first gesture input value, an identification of the first gaming device operation and/or user-specific data.

In some embodiments, operations include providing, to the user, a game that prompts the user to provide the user-specific gesture input to the gesture input device to train the system to associate the first gesture input value with the first gaming device operation (block 1112). In this manner, the gaming device may help to train the user to define and/or use the user-specific gestures. Operations may include providing, to the user and after training occurs, a calibration output that prompts the user to provide calibration inputs corresponding to the first gesture input value (block 1114). In some embodiments, the calibration inputs may include updates to the first gesture input value and may be stored in the personalized gesture library.

FURTHER DEFINITIONS AND EMBODIMENTS

In the above-description of various embodiments, various aspects may be illustrated and described herein in any of a number of patentable classes or contexts including any new and useful process, machine, manufacture, or composition of matter, or any new and useful improvement thereof. Accordingly, various embodiments described herein may be implemented entirely by hardware, entirely by software (including firmware, resident software, micro-code, etc.) or by combining software and hardware implementation that may all generally be referred to herein as a "circuit," "module," "component," or "system." Furthermore, various embodiments described herein may take the form of a computer program product comprising one or more computer readable media having computer readable program code embodied thereon.

Any combination of one or more computer readable media may be used. The computer readable media may be a computer readable signal medium or a non-transitory computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, radio frequency ("RF"), etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, Common Business Oriented Language ("COBOL") 2002, PHP: Hypertext Processor ("PHP"), Advanced Business Application Programming ("ABAP"), dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Various embodiments were described herein with reference to flowchart illustrations and/or block diagrams of methods, apparatus (systems), devices and computer program products according to various embodiments described herein. It will be understood that each block of the flowchart illustrations and/or block diagrams, and combinations of blocks in the flowchart illustrations and/or block diagrams, can be implemented by computer program instructions. These computer program instructions may be provided to a processing circuit of a general purpose computer, special purpose computer, or other programmable data processing apparatus to produce a machine, such that the instructions, which execute via the processing circuit of the computer or other programmable instruction execution apparatus, create a mechanism for implementing the functions/acts specified in the flowchart and/or block diagram block or blocks.

These computer program instructions may also be stored in a non-transitory computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. A gaming device comprising:

a gesture input device to detect non-contact gesture inputs performed by a user;

a processor circuit; and a memory coupled to the processor circuit, the memory comprising machine-readable instructions that, when executed by the processor circuit, cause the processor circuit to:

receive a first gesture input value from the gesture input device and that corresponds to a user-specific gesture that the user performs, wherein the user-specific gesture comprises a non-contact hand motion;

associate the first gesture input value with a first gaming device operation to be performed by the gaming device;

receive the first gesture input value that is associated with the first gaming device operation; and responsive to receiving the first gesture input value that is associated with the first gaming device operation, cause the gaming device to perform the first gaming device operation; and provide, to the user, a game that prompts the user to provide the user-specific gesture as input to the gesture input device to train the device to associate the first gesture input value with the first gaming device operation, wherein providing the personalized gesture training output further cause the processor circuit to provide, to the user, a sequence of gesture instructions that prompts the user to perform the user-specific gesture, wherein the sequence of instructions comprises the game that the user plays, and wherein the user-specific gesture comprises a hand motion that corresponds to a data graphic that represents a property of operation of the gaming device, wherein a first portion of the plurality of gesture input values are interpreted to respective ones of different gesture input data formats prior to a request from the gaming device, and wherein a second portion of the plurality of gesture input values are interpreted to respective ones of the different gesture input data formats in response to a request from the gaming device.

2. The gaming device of claim 1, wherein the instructions further cause the processor circuit to generate a personalized gesture library that comprises a plurality of gesture input values that includes the first gesture input value and that are associated with respective ones of a plurality of gaming device operations that includes the first gaming device operation.

3. The gaming device of claim 2, wherein the personalized gesture library comprises user identification data that is associated with corresponding ones of the plurality of gesture input values and the plurality of gaming device operations.

4. The gaming device of claim 1, wherein the instructions further cause the processor circuit to perform a user identification operation to determine an identity of the user, wherein performing the user identification operation comprises using the first gesture input value and receiving at least one other input corresponding to the user.

5. The gaming device of claim 1, wherein the instructions further cause the processor circuit to provide a personalized gesture training output to the user to prompt the user to perform the user-specific gesture that corresponds to the first gesture input value and the first gaming device operation that is associated with the first gesture input value.

6. The gaming device of claim 5, wherein the instructions to provide the personalized gesture training output further cause the processor circuit to provide, to the user, suggested gestures to be the user-specific gesture.

7. The gaming device of claim 1, wherein the user-specific gesture causes the data graphic to be modified to adjust the property of operation of the gaming device.

8. The gaming device of claim 7, wherein the data graphic comprises a pay table curve, wherein the property of operation of the gaming device comprises game volatility, and wherein the user-specific gesture comprises the first gesture input value that causes the game volatility to be modified.

9. The gaming device of claim 7, wherein the data graphic comprises an environmental property corresponding to the gaming device, and wherein the user-specific gesture comprises the first gesture input value that causes the environmental property to be modified.

10. The gaming device of claim 1, wherein the instructions that cause the processor circuit to receive the first gesture input value further cause the processor circuit to detect a plurality of gesture inputs that comprise multiple occurrences of a sequence of user-specific gestures, wherein, responsive to detecting the sequence of user-specific gestures, the processor circuit is further caused to provide a message to the user that comprises a suggestion to define the sequence of user-specific gestures as a single gesture.

11. The gaming device of claim 1, wherein the hand motion is performed using a 3D gesture input sensor.

12. The gaming device of claim 1, wherein the hand motion is performed using an image capture device.

13. A system comprising:

a gesture input device to detect a first gesture by a user of a gaming device and to generate a first gesture input value based on the first gesture;

processor circuit; and a memory coupled to the processor circuit, the memory comprising machine-readable instructions that, when executed by the processor circuit, cause the processor circuit to:

receive the first gesture input value from the gesture input device, the first gesture input value corresponding to a user-specific gesture that the user performs and that is associated with a first gaming operation of the gaming device;

responsive to receiving the first gesture input value, cause the gaming device to perform the first gaming operation; and provide, to the user, a calibration output that prompts the user to provide calibration inputs corresponding to the first gesture input value, wherein the calibration inputs comprise updates to the first gesture input value; and a data repository that comprises a personalized gesture library that comprises a plurality of gesture input values that includes the first gesture input value, and that are associated with respective ones of a plurality of gaming device operations that includes the first gaming operation, wherein the user-specific gesture comprises a non-contact hand motion, wherein a first portion of the plurality of gesture input values are interpreted to respective ones of different gesture input data formats prior to a request from the gaming device, and wherein a second portion of the plurality of gesture input values are interpreted to respective ones of the different gesture input data formats in response to a request from the gaming device.

14. The system of claim 13, wherein the first gesture input device comprises an image capture device that is remotely located from the gaming device.

15. The system of claim 13, wherein the gaming device comprises one of a plurality of gaming devices, wherein responsive to receiving the first gesture input value, the instructions further cause the processing circuit to cause the plurality of gaming devices to each perform the first gaming operation.

16. The system of claim 13, wherein ones of the plurality of gesture input values comprise different gesture input data formats corresponding using different types of gesture input devices on different gaming devices, and wherein the personalized library further comprises different gesture input values corresponding to the user-specific gesture for each of the different gesture input data formats.

17. The system of claim 13, wherein the data repository is located remote from the gaming device, wherein the first gesture input value is sent to the personalized gesture library, and wherein the first gaming operation that is associated with the first gesture input value is provided to the gaming device.

18. A method comprising:

detecting, by a non-contact gesture input device of a gaming device, a first gesture by a user of the gaming device;

generating, by the non-contact gesture input device, a first gesture input value based on the first gesture that is a user-specific gesture;

associating the first gesture input value with a first gaming device operation to be performed by the gaming device responsive to receiving the first gesture;

responsive to receiving the first gesture input value that is associated with the first gaming device operation, causing the gaming device to perform the first gaming device operation;

causing the first gesture input value, an identification of the first gaming device operation and user-specific data to be stored in a personalized gesture library that is accessible to other gaming devices, wherein the personalized gesture library comprises a persistent store of the first gesture input value, an identification of the first gaming device operation and user-specific data;

providing, to the user, a game that prompts the user to provide the user-specific gesture input to the gesture input device to train the system to associate the first gesture input value with the first gaming device operation; and providing, to the user and after training occurs, a calibration output that prompts the user to provide calibration inputs corresponding to the first gesture input value, wherein the calibration inputs comprise updates to the first gesture input value, wherein the user-specific gesture comprises a hand motion that corresponds to a data graphic, wherein a first portion of the plurality of gesture input values are interpreted to respective ones of different gesture input data formats prior to a request from the gaming device, and wherein a second portion of the plurality of gesture input values are interpreted to respective ones of the different gesture input data formats in response to a request from the gaming device.

* * * * *